United States Patent
Yokoyama et al.

(10) Patent No.: US 10,519,850 B2
(45) Date of Patent: Dec. 31, 2019

(54) TURBINE HOUSING AND METHOD OF PRODUCING TURBINE HOUSING

(71) Applicant: MITSUBISHI HEAVY INDUSTRIES ENGINE & TURBOCHARGER, LTD., Sagamihara-shi, Kanagawa (JP)

(72) Inventors: Takao Yokoyama, Tokyo (JP); Makoto Ozaki, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 338 days.

(21) Appl. No.: 15/515,321

(22) PCT Filed: Nov. 4, 2014

(86) PCT No.: PCT/JP2014/079239
§ 371 (c)(1),
(2) Date: Mar. 29, 2017

(87) PCT Pub. No.: WO2016/071959
PCT Pub. Date: May 12, 2016

(65) Prior Publication Data
US 2017/0204743 A1    Jul. 20, 2017

(51) Int. Cl.
*F02B 37/00* (2006.01)
*F02B 39/00* (2006.01)
*F01D 9/02* (2006.01)

(52) U.S. Cl.
CPC .............. *F02B 37/00* (2013.01); *F01D 9/026* (2013.01); *F02B 39/00* (2013.01);
(Continued)

(58) Field of Classification Search
CPC .......... F01D 9/026; F02B 37/00; F02B 39/00; Y02T 10/144; F05D 2220/40; F05D 2300/516; F05D 2240/15; F04D 29/422
See application file for complete search history.

(56) References Cited

U.S. PATENT DOCUMENTS 6,220,234 B1 * 4/2001 Baker .................... F02C 7/04
                                                      29/888.02
6,742,989 B2 * 6/2004 Osako .................. F01D 5/048
                                                      415/204
(Continued)

FOREIGN PATENT DOCUMENTS

EP    3 088 699 A1    11/2016
JP    60-23221 U     2/1985
(Continued)

OTHER PUBLICATIONS

English translation of JP-2007002791-A (Year: 2007).*
(Continued)

*Primary Examiner* — Richard A Edgar
*Assistant Examiner* — Topaz L. Elliott
(74) *Attorney, Agent, or Firm* — Birch, Stewart, Kolasch & Birch, LLP

(57) ABSTRACT

An object is to provide a turbine housing with a simple structure whereby it is possible to reduce flow resistance of exhaust gas and improve efficiency of a turbocharger. A turbine housing made by casting has an opening part formed on a hub side of a scroll part, the opening part having a radius R2 which satisfies a relationship R1<R2, provided that R1 is a radial directional distance from an axis of a turbine wheel to a tip of a shroud part and R2 is a radial directional distance from the axis to an inner peripheral edge of a hub-side wall surface of the scroll part. A roughness of a flow-path surface in a region A is smaller than in a region B, provided that the region A is a predetermined range from the tip of the shroud part and the region B is a predetermined range adjacent to the region A, among flow-path surfaces of the shroud part and the scroll part facing a scroll flow path on an outer side, in a radial direction, of the tip of the shroud part.

20 Claims, 15 Drawing Sheets

(52) U.S. Cl.
CPC ...... *F05D 2220/40* (2013.01); *F05D 2230/10* (2013.01); *F05D 2230/21* (2013.01); *F05D 2250/51* (2013.01); *F05D 2250/71* (2013.01); *F05D 2300/516* (2013.01)

(56) References Cited

U.S. PATENT DOCUMENTS

| | | | |
|---|---|---|---|
| 7,802,429 B2* | 9/2010 | Yokoyama | F01D 9/026 60/605.1 |
| 8,308,431 B2* | 11/2012 | Ueno | F01D 25/16 415/178 |
| 9,404,370 B2* | 8/2016 | Scheuermann | F01D 9/026 |
| 9,828,913 B2* | 11/2017 | Sloss | F01D 9/026 |
| 2003/0077170 A1 | 4/2003 | Osako et al. | |
| 2003/0150212 A1 | 8/2003 | Rutschmann et al. | |
| 2012/0051899 A1* | 3/2012 | Petitjean | F01D 9/026 415/205 |
| 2012/0183392 A1* | 7/2012 | Stempien | F01D 9/026 415/182.1 |
| 2014/0093407 A1* | 4/2014 | Calkins | F01D 15/08 417/405 |
| 2015/0369251 A1* | 12/2015 | Jung | F01D 9/026 417/406 |
| 2017/0037773 A1* | 2/2017 | John | F01D 25/24 |
| 2018/0250791 A1* | 9/2018 | Rao | B24B 31/116 |

FOREIGN PATENT DOCUMENTS

| | | | |
|---|---|---|---|
| JP | 62247127 A | * | 10/1987 |
| JP | 2-7332 U | | 1/1990 |
| JP | 2-90301 U | | 7/1990 |
| JP | 2003-120303 A | | 4/2003 |
| JP | 2003-214170 A | | 7/2003 |
| JP | 2006-132386 A | | 5/2006 |
| JP | 2007-2791 A | | 1/2007 |
| JP | 2007-32310 A | | 2/2007 |
| JP | 2007-113501 A | | 5/2007 |
| WO | WO 2015/097872 A1 | | 7/2015 |

OTHER PUBLICATIONS

English translation of JP-2007032310-A (Year: 2007).*
International Search Report for PCT/JP2014/079239 (PCT/ISA/210) dated Jan. 20, 2015.
International Preliminary Report on Patentability and English translation of the Written Opinion of the International Searching Authority (Forms PCT/IB326, PCT/IB/338, PCT/IB/373 and PCT/ISA/237), dated May 18, 2017, for International Application No. PCT/JP2014/079239.

* cited by examiner

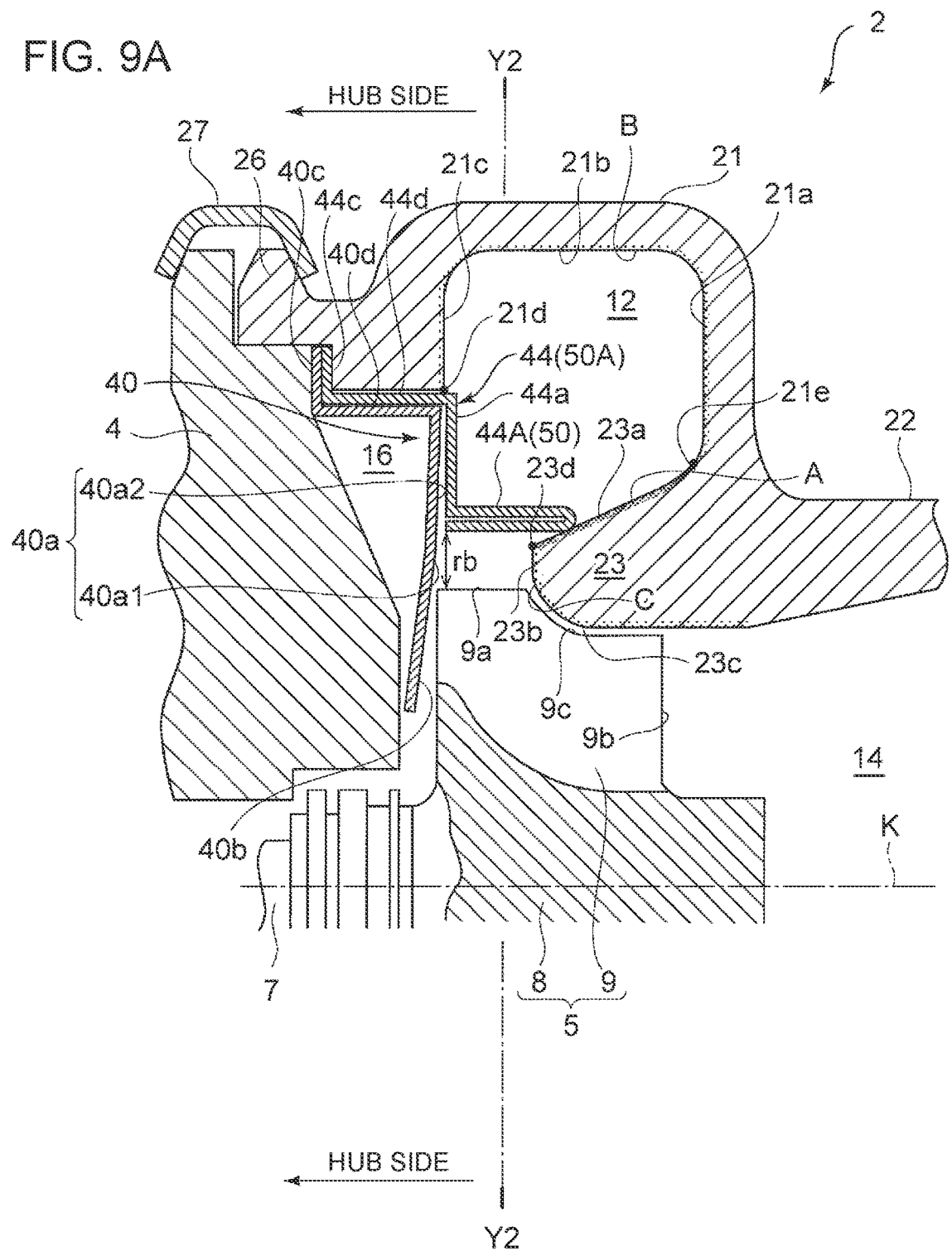

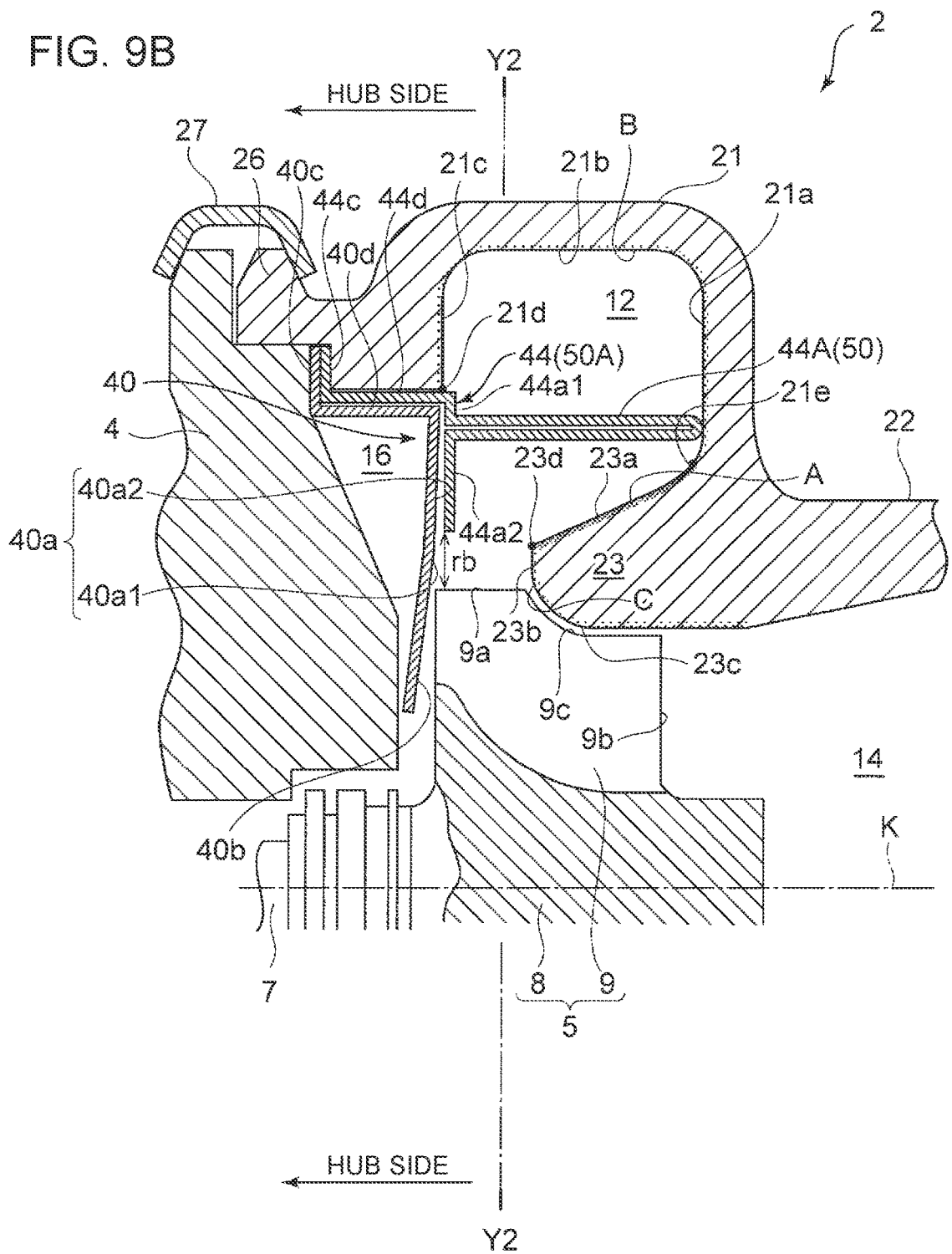

TURBINE HOUSING AND METHOD OF PRODUCING TURBINE HOUSING

TECHNICAL FIELD

The present disclosure relates to a turbine housing and a method of producing the turbine housing.

BACKGROUND ART

As a technique to improve an output of an engine, known is a method which compresses intake air with a turbocharger and supplies an engine with the compressed intake air (supercharging). This method is widely used for automobile engines and the like. A turbocharger normally includes a rotary shaft, a turbine wheel disposed on an end side of the rotary shaft, and a compressor wheel disposed on the opposite end side of the rotary shaft. The rotary shaft rotates at a high speed in response to exhaust energy of exhaust gas being applied to the turbine wheel, and thereby the compressor wheel disposed on the opposite end side of the rotary shaft compresses intake air.

An engine equipped with a turbocharger can achieve a high output from a small exhaust amount. Thus, in recent years, a turbocharger is mounted to an automobile engine in particular to reduce the size of the engine, in order to improve fuel consumption. In this context, needs toward turbochargers for an engine of a small exhaust amount have been also increasing, and turbocharges have been reduced in size even further.

A turbine housing of a turbocharger is normally produced by casting. A small turbine housing has a higher surface roughness inside the housing than a large turbine housing. Further, a tongue portion of a small turbine housing is thicker due to the minimum possible thickness in casting. As a result, a small turbine housing has a greater flow resistance of exhaust gas. Moreover, a small turbine housing has greater casting errors than a large turbine housing, which increases variation in performance and flow-rate characteristics between products.

CITATION LIST

Patent Literature

Patent Document 1: PCT/JP2013/085143

SUMMARY

Problems to be Solved

Under such a background, the present applicant filed an earlier application (Patent Document 1) related to a turbine housing with an improved surface roughness inside the housing, which reduces the flow resistance of exhaust gas and improves efficiency of a turbocharger. The turbine housing of the earlier application is a casted turbine housing provided with a sheet-metal member forming an inner channel inside the turbine housing, which makes the structure rather complicated.

The present invention was made under the above described conditions in the related art, and an object of at least one embodiment of the present invention is to provide a turbine housing of a simple structure with a reduced flow resistance of exhaust gas and an improved turbocharger efficiency.

Solution to the Problems (1) A turbine housing made by casting for housing a turbine wheel configured to rotate by exhaust gas, according to at least one embodiment of the present invention, comprises: a scroll part forming a scroll flow path of an annular shape through which the exhaust gas to be supplied to the turbine wheel flows, around the turbine wheel; an exhaust duct part forming an exhaust flow path through which the exhaust gas having passed through the turbine wheel flows along an axial direction of the turbine wheel; and a shroud part protruding toward a hub at a connection section between the scroll part and the exhaust duct part, the shroud part having an outer peripheral surface facing the scroll flow path and an inner peripheral surface formed at a predetermined gap from rotor blades of the turbine wheel. An opening part is formed on a hub side of the scroll part, the opening part having a radius $R2$ which satisfies a relationship $R1<R2$, provided that $R1$ is a radial directional distance from an axis of the turbine wheel to a tip of the shroud part and $R2$ is a radial directional distance from the axis of the turbine wheel to an inner peripheral edge of a hub-side wall surface of the scroll part in a cross section taken along the axial direction of the turbine wheel. A roughness of a flow-path surface in a region A is smaller than a roughness of a flow-path surface in a region B, provided that the region A is a predetermined range from the tip of the shroud part and the region B is a predetermined range adjacent to the region A, among flow-path surfaces of the shroud part and the scroll part facing the scroll flow path on an outer side, in a radial direction, of the tip of the shroud part in a cross section taken along the axial direction of the turbine wheel.

In the turbine housing described in the above (1), an opening part is formed on a hub side of the scroll part, the opening part having a radius $R2$ which satisfies a relationship $R1<R2$, provided that $R1$ is a radial directional distance from the axis of the turbine wheel to a tip of the shroud part and $R2$ is a radial directional distance from the axis of the turbine wheel to an inner peripheral edge of a hub-side wall surface of the scroll part in a cross section taken along the axial direction of the turbine wheel. In contrast, for the opening part 16' of the turbine housing 2' of the typical comparative example illustrated in FIG. 12, the radius $R2'$ has a relationship $R1' \geq R2'$.

With the turbine housing having a larger opening part than a typical opening, it is possible to work on the inside of the turbine housing after casting by making use of the opening part larger than a typical opening. Accordingly, it is possible to process a flow-path surface in the region A corresponding to the inner peripheral side of the scroll flow path where the flow rate is high and an influence on the flow resistance is significant, and to reduce the roughness of the flow-path surface, which makes it possible to reduce the flow resistance of exhaust gas in the turbine housing and to improve the efficiency of the turbocharger.

(2) In some embodiments, in the turbine housing according to the above (1), an existence range of the region A in the radial direction includes at least a part of a range of from 1.15 D to 1.4 D, provided that D is an outer diameter of the turbine wheel.

Further, in some embodiments, an existence range of the region A in the radial direction includes at least a part of a range of from 1.20 D to 1.4 D.

Still further, in some embodiments, an existence range of the region A in the radial direction includes at least a part of a range of from 1.25 D to 1.4 D.

With the above configuration (2), the region A at least includes the inner peripheral side of the scroll flow path in particular, where the flow rate is high and an influence on the flow resistance is significant. Thus, it possible to reduce the flow resistance of exhaust gas in the turbine housing and to improve the efficiency of the turbocharger.

(3) In some embodiments, in the turbine housing according to the above (1) or (2), an outer peripheral surface of the shroud part includes an inclined surface inclined from the axial direction of the turbine wheel, and the region A includes at least a part of the outer peripheral surface, in a cross section along the axial direction of the turbine wheel.

With the above configuration (3), the region A at least includes an outer peripheral surface of the shroud part disposed on the radially inner side of the scroll flow path in particular, where the flow rate is high and an influence on the flow resistance is significant. Further, if the outer peripheral surface of the shroud part includes an inclined surface, the outer peripheral surface contacts a fluid in a larger contact area, and thus the influence on the flow resistance is even greater. Thus, according to the above embodiment, it possible to reduce the flow resistance of exhaust gas in the turbine housing and to improve the efficiency of the turbocharger.

(4) In some embodiments, the turbine housing according to any one of the above (1) to (3) further comprises a first plate member of an annular shape disposed in the opening part, the first plate member having a flow-path portion facing the scroll flow path and a back-face portion disposed with a gap from a back face of the turbine wheel.

With the above configuration (4), provided in the opening part is the turbine-housing first plate member having the flow-path portion facing the scroll flow path. The first plate member is a member separate from the casted turbine housing, and the roughness of the surface of the first plate member can be easily set to be smaller than the surface roughness of the turbine housing. Thus, according to this embodiment, by reducing the roughness of the flow-path portion of the first plate member facing the scroll flow path, it is possible to reduce the air resistance of exhaust gas flowing through the scroll flow path.

(5) In some embodiments, the turbine housing according to the above (4) further comprises: an intake duct part forming an intake flow path for guiding the exhaust gas taken in from outside the turbine housing to the scroll flow path; and a tongue portion separating the intake flow path and the scroll flow path in the radial direction and being formed by a tongue-portion member provided as a separate member from the turbine housing, the tongue-portion member extending from a side of the first plate member toward the shroud part.

With the above configuration (5), the tongue portion is formed by the tongue-portion member provided separately from the turbine housing. Thus, when the inside of the turbine housing is processed through the opening part after casting, the tongue portion does not interfere with the process, unlike a case in which a casted turbine housing and a tongue portion are formed integrally. Thus, the inside of the turbine housing can be processed easily.

Further, as compared to a case in which a tongue portion is formed integrally with a casted turbine housing, it is possible to form the tongue portion to have a smaller thickness. Accordingly, it is possible to suppress flow strain that occurs downstream the tongue portion, and thus it is possible to reduce the flow resistance of exhaust gas flowing from the intake flow path to the scroll flow path.

(6) In some embodiments, in the turbine housing according to the above (5), the tongue-portion member is the first plate member including a bend portion made from sheet metal and folded along the axial direction of the turbine wheel, the bend portion forming the tongue portion.

According to the above configuration (6), the tongue portion is formed by the bend portion of the first plate member, and thereby it is possible to form the tongue portion made from sheet metal as a separate member from the turbine housing with a simple structure made of fewer parts.

(7) In some embodiments, the turbine housing according to the above (5) further comprises a second plate member disposed so as to cover a part of a flow-path portion of the first plate member in the opening part of the turbine housing. The tongue-portion member includes the second plate member.

With the above configuration (7), the turbine housing further comprises a second plate member disposed so as to cover a part of a flow-path portion of the first plate member. The second plate member forms the tongue portion. According to this embodiment, it is possible to form the tongue portion provided as a separate member from the turbine housing with a simple structure without performing a special processing on the first plate member.

(8) In some embodiments, in the turbine housing according to the above (7), the second plate member has a bend portion made from sheet metal and folded along the axial direction of the turbine wheel. The bend portion forms the tongue portion.

With this configuration (8), it is possible to form a sheet-metal tongue portion provided as a separate member from the turbine housing with a simple structure without performing a special processing on the first plate member.

(9) In some embodiments, in the turbine housing according to the above (7) or (8), the second plate member includes an annular member extending over an entire periphery of the turbine wheel in a circumferential direction, and a flow-path portion facing the scroll flow path excluding a part of the first plate member covered with the second plate member has a radial directional width which is constant over the entire periphery of the turbine wheel in the circumferential direction, in a cross section along the axial direction of the turbine wheel.

With this configuration (9), the flow-path surface of the first plate member is exposed to high-temperature exhaust gas at a constant radial-directional width over the entire periphery of the turbine wheel in the circumferential direction. Accordingly, it is possible to average the heat input amount to the first plate member in the circumferential direction, and to prevent the first plate member from deforming unevenly due to thermal expansion.

(10) In some embodiments, in the turbine housing according to any one of the above (1) to (3), a bearing housing for housing bearing devices rotatably supporting a rotational shaft coupled to the turbine wheel is coupled to a back-face side of the turbine housing. The turbine housing further comprises an intake duct part forming an intake flow path for guiding the exhaust gas taken in from outside the turbine housing to the scroll flow path. A tongue portion separating the intake flow path and the scroll flow path in the radial direction is formed by a tongue-portion member provided as a separate member from the turbine housing, the tongue-portion member extending from the bearing housing toward the shroud part.

With this configuration (10), the tongue portion is formed by the tongue-portion member provided separately from the turbine housing. The tongue-portion member extends from the bearing housing toward the shroud part. Thus, when the inside of the turbine housing is processed through the opening part after casting, the tongue portion does not interfere with the process, unlike a case in which a casted turbine housing and a tongue portion are formed integrally. Thus, the inside of the turbine housing can be processed easily.

(11) In some embodiments, in the turbine housing according to the above (10), the tongue-portion member includes a third plate member connected to the bearing housing.

With this configuration (11), the tongue portion is formed by the third plate member connected to the bearing housing. The third plate member is formed as a separate member from the turbine housing made by casting, and thus, as compared to a case in which a tongue portion is integrally formed with a casted turbine housing, it is possible to form a thin tongue portion without difficulty. Accordingly; it is possible to suppress flow strain that occurs downstream the tongue portion, and thus it is possible to reduce the flow resistance of exhaust gas flowing from the intake flow path to the scroll flow path. Further, it is possible to form the tongue portion with a simple structure of connecting the third plate member to the bearing housing.

(12) In some embodiments, in the turbine housing according to the above (11), the third plate member is made from sheet metal.

With this configuration (12), the third plate member is made from sheet metal, and thus it is possible to form a thin tongue portion with a simple structure.

(13) In some embodiments, in the turbine housing according to any one of claims (5) to (12), the region A is formed to have a radial directional width which is constant over an entire periphery of the turbine wheel in a circumferential direction, in a cross section seen in the axial direction of the turbine wheel.

In the above configurations (5) to (12), the tongue portion is formed by a separate member provided separately from the turbine housing. In contrast, the typical turbine housing 2' depicted in FIG. 5 has a tongue portion 50' integrally formed with the turbine housing 2', and thus the tongue portion 50' makes it difficult to form the region A having a constant radial directional width over the entire periphery of the turbine wheel 5' in the circumferential direction.

With the above configuration (13), the region A is formed to have a constant radial directional width over the entire periphery of the turbine wheel in the circumferential direction, which makes it possible to reduce the flow resistance of exhaust gas over the entire periphery of the turbine wheel in the circumferential direction.

(14) In some embodiments, in the turbine housing according to any one of the above (6), (8), and (12), a flow-path center of the intake flow path is formed into a S-shaped curve curving outward in the radial direction after curving inward in the radial direction, from an inlet part of the intake flow path toward a merging part with the scroll flow path, in a cross section as seen from the axial direction of the turbine wheel.

In the above configurations (6), (8), and (12), the tongue portion is formed by a plate member made from sheet metal. If the tongue portion is to be formed by a plate member of sheet metal, the tongue portion is less thick and may oscillate due to a pressure difference between the outer peripheral side and the inner peripheral side of the tongue portion, thus increasing the flow resistance. Further, a pressure difference applied to the tongue portion may deform the tongue portion. The pressure decreases at the radially inner side of the tongue portion due to a high-speed exhaust gas flow, and is lower than the pressure at the outer peripheral side of the tongue portion.

Thus, with the above configuration (14), with the flow-path center of the intake flow path formed into an S-shape curve, the flow of exhaust gas flowing the radially outer side of the tongue portion can be turned outward, which makes it possible to reduce the pressure at the radially outer side of the tongue portion and to reduce a pressure difference applied to the tongue portion.

(15) A method of producing a turbine housing for housing a turbine wheel configured to rotate by exhaust gas, according to at least one embodiment of the present invention, is for a turbine housing comprising: a scroll part forming a scroll flow path of an annular shape through which the exhaust gas to be supplied to the turbine wheel flows, around the turbine wheel; an exhaust duct part forming an exhaust flow path through which the exhaust gas having passed through the turbine wheel flows along an axial direction of the turbine wheel; and a shroud part protruding toward a hub at a connection section between the scroll part and the exhaust duct part, the shroud part having an outer peripheral surface facing the scroll flow path and an inner peripheral surface formed at a predetermined gap from rotor blades of the turbine wheel. The method comprises: forming an opening part on a hub side of the scroll part, the opening part having a radius R2 which satisfies a relationship R1<R2, provided that R1 is a radial directional distance from an axis of the turbine wheel to a tip of the shroud part and R2 is a radial directional distance from the axis of the turbine wheel to an inner peripheral edge of a hub-side wall surface of the scroll part in a cross section taken along the axial direction of the turbine wheel; and processing a flow-path surface in a region A after casting so that a roughness of the flow-path surface in the region A becomes smaller than a roughness of a flow-path surface in a region B, provided that the region A is a predetermined range from the tip of the shroud part and the region B is a predetermined range adjacent to the region A, among flow-path surfaces of the shroud part and the scroll part facing the scroll flow path on an outer side, in a radial direction, of the tip of the shroud part in a cross section taken along the axial direction of the turbine wheel.

According to the above method of producing a turbine housing (15), it is possible to make use of the larger opening part than a typical opening to work on the inside of the turbine housing after casting, thereby reducing the roughness of the flow-path surface inside the turbine housing. Particularly, it is possible to process a flow-path surface in the region A corresponding to the inner peripheral side of the scroll flow path where the flow rate is high and an influence on the flow resistance is significant, and to reduce the roughness of the flow-path surface, which makes it possible to reduce the flow resistance of exhaust gas in the turbine housing and to improve the efficiency of the turbocharger.

(16) In some embodiments, in the method of producing a turbine housing according to the above (15), the step of processing the flow-path surface of the region A comprises machine processing.

According to the above method (16), it is possible to make use of the larger opening part than a typical opening to work on the inside of the turbine housing after casting by machine processing. Thus, it is possible to reduce the roughness of the flow-path surface inside the turbine housing by a simple method.

(17) In some embodiments, in the method of producing a turbine housing according to the above (16), the step of processing the flow-path surface of the region A comprises turning-processing which includes: inserting a tool bit into the turbine housing made by casting, through the opening part; and rotating the turbine housing made by casting to cut or grind the flow-path surface of the region A.

According to the above method (17), with the turning-processing which includes inserting a tool bit into the turbine housing through the opening part larger than a typical opening and rotating the turbine housing to cut or grind the flow-path surface of the region A, it is possible to reduce the roughness of the flow-path surface inside the turbine housing by a simple method.

ADVANTAGEOUS EFFECTS

According to at least one embodiment of the present invention, it is possible to provide a turbine housing of a simple structure with a reduced flow resistance of exhaust gas and an improved turbine efficiency.

BRIEF DESCRIPTION OF DRAWINGS

FIG. 9A is a partial cross-sectional view of a turbine housing according to an embodiment of the present invention, taken along the axial direction of the turbine wheel of the turbine housing, showing a part in the a-a cross section in FIG. 9D.

FIG. 9B is a partial cross-sectional view of a turbine housing according to an embodiment of the present invention, taken along the axial direction of the turbine wheel of the turbine housing, showing a part in the b-b cross section in FIG. 9D.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
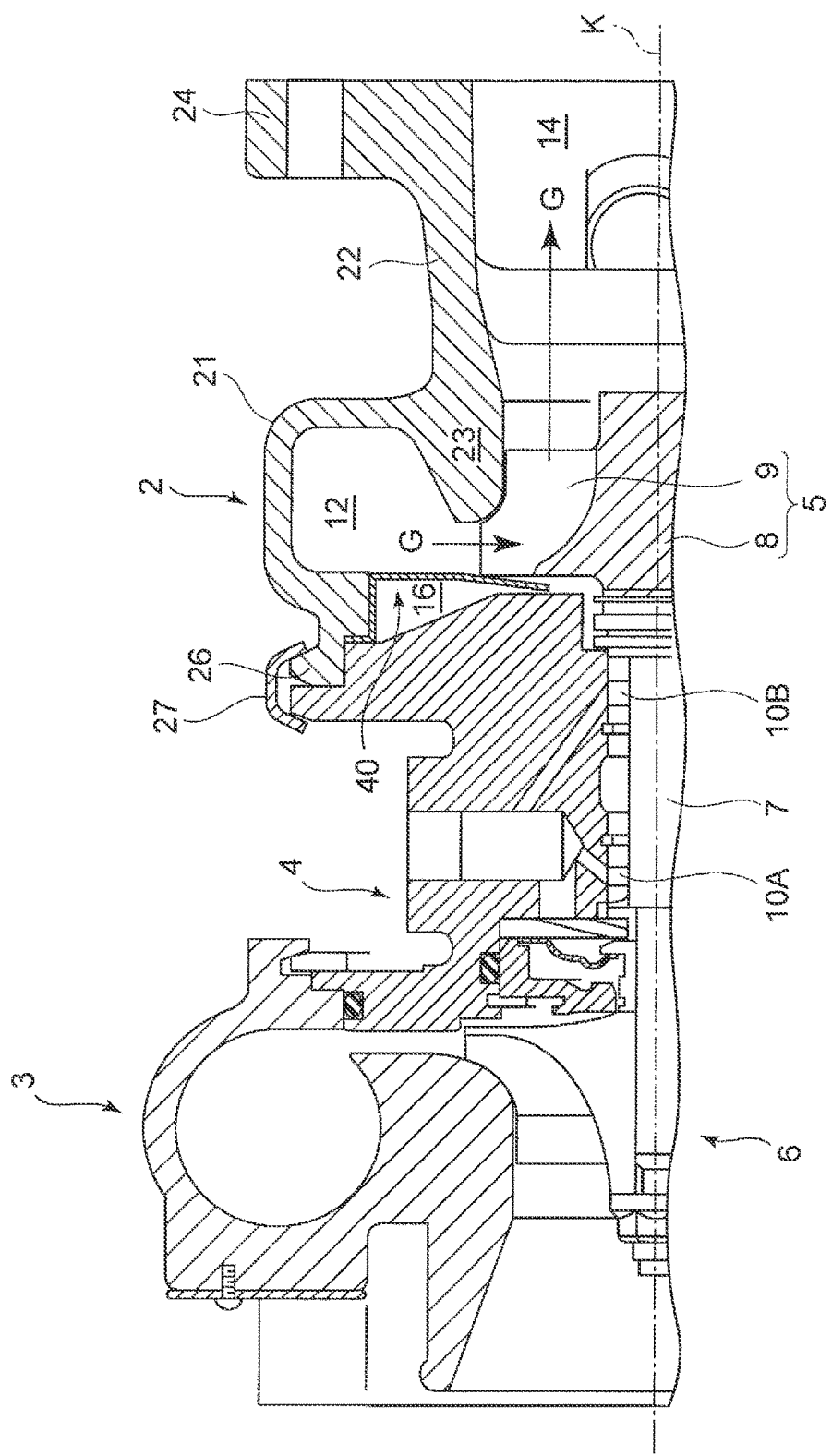
FIG. 1 is a cross-sectional view of a turbocharger according to an embodiment of the present invention, taken along the axial direction of the rotational shaft of the turbocharger.

FIG. 1 is a cross-sectional view of a turbocharger according to an embodiment of the present invention, taken along the axial direction of the rotational shaft of the turbocharger.

The turbocharger 1 according to an embodiment of the present invention is, though not particularly limited, a small turbocharger to be mounted to an automobile engine, for instance.

As depicted in FIG. 1, the turbocharger 1 according to an embodiment of the present invention includes a turbine housing 2 for housing a turbine wheel 5, a compressor housing 3 for housing the compressor wheel 6, and a bearing housing 4 for housing bearing devices 10A, 10B rotatably supporting a rotational shaft 7. The turbine wheel 5 is coupled to an end of the rotational shaft 7 and the compressor wheel 6 is coupled to the other end of the rotational shaft 7. Further, the turbine wheel 5 includes a hub portion 8 having a truncated conical shape, and a plurality of rotor blades 9 disposed at intervals on the outer peripheral surface of the hub portion 8.

Exhaust gas G taken into the turbine housing 2 from a non-depicted engine flows through a scroll flow path 12 of an annular shape formed around the turbine wheel 5 before being supplied to the turbine wheel 5. Exhaust gas flows into the rotor blades 9 from leading edges 9a and flows out from trailing edges 9b, and further flows through an exhaust flow path 14 along the extending direction of the axis K of the turbine wheel 5 to be discharged outside of the turbine housing 2. Further, as the turbine wheel 5 rotates in response to the exhaust gas G, the compressor wheel 6 connected to the same shaft as the turbine wheel 5 also rotates. Accordingly, supply air compressed by the compressor wheel 6 is supplied to an engine (not depicted).

Figure 2:
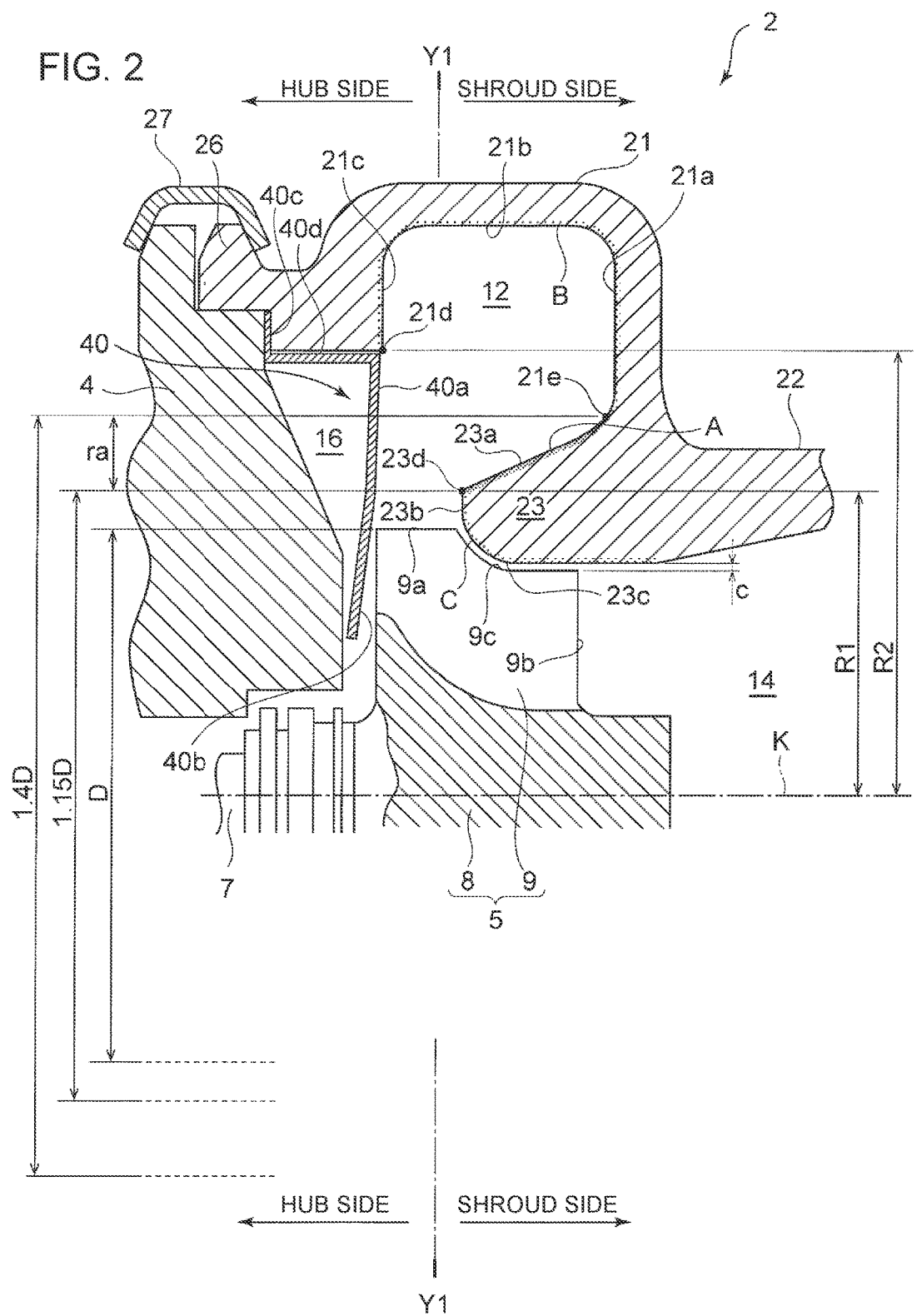
FIG. 2 is a partial cross-sectional view of a turbine housing according to an embodiment of the present invention, taken along the axial direction of the turbine wheel of the turbine housing.
Figure 3:
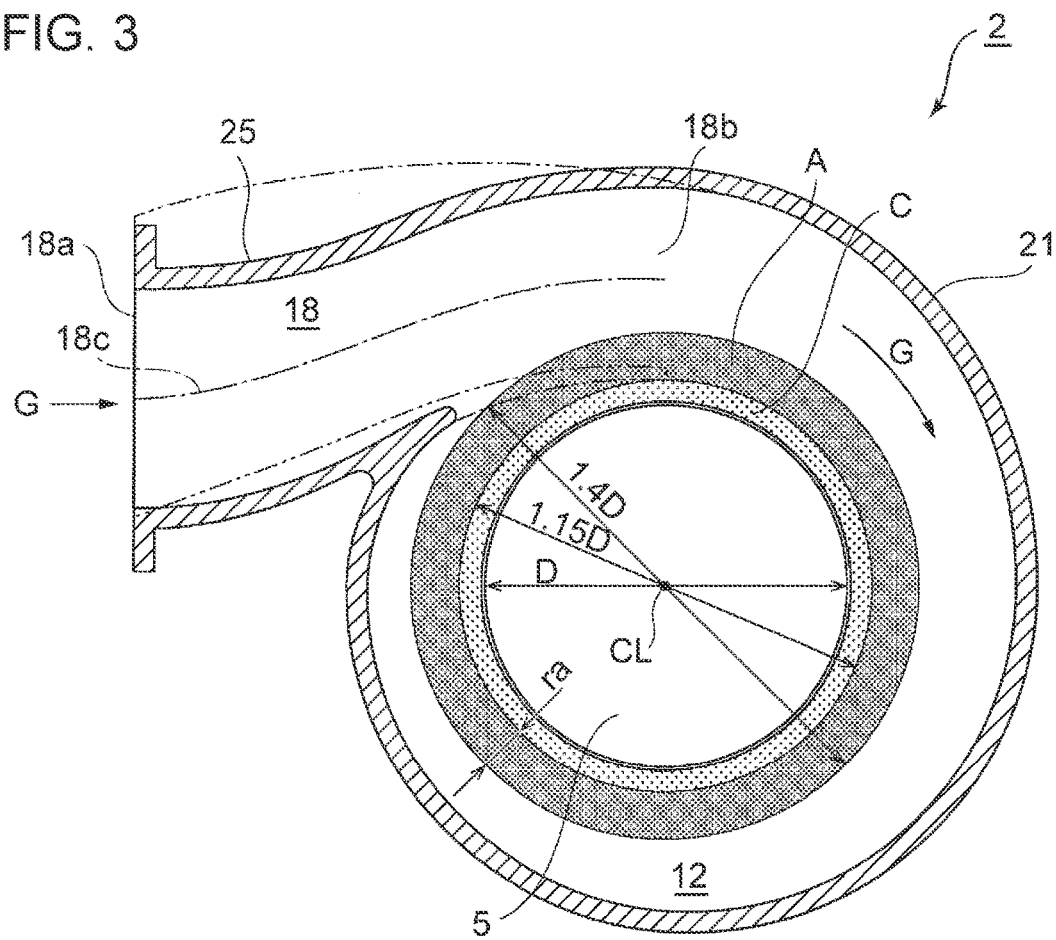
FIG. 3 is a cross-sectional view showing the shroud side of the Y1-Y1 cross section in FIG. 2.
Figure 4:
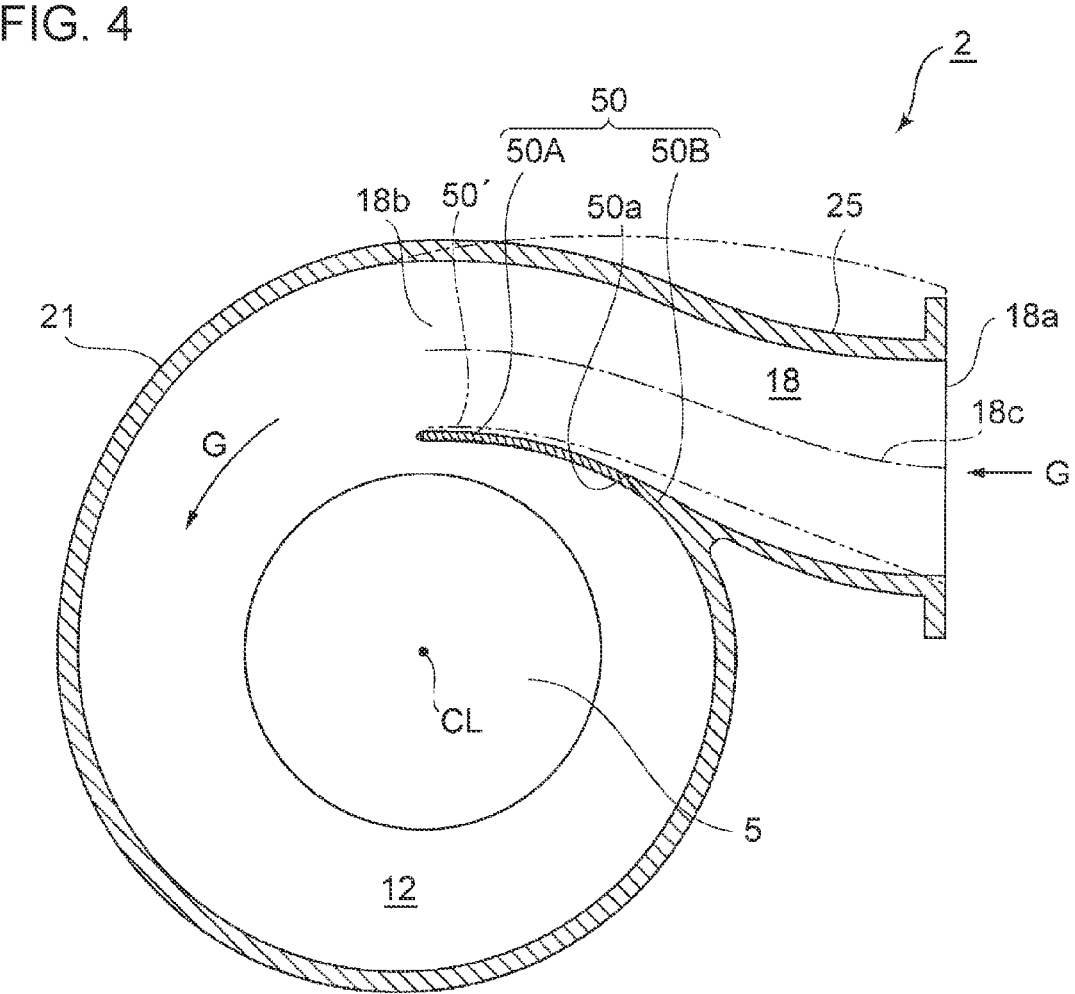
FIG. 4 is a cross-sectional view showing the hub side of the Y1-Y1 cross section in FIG. 2.
Figure 5:
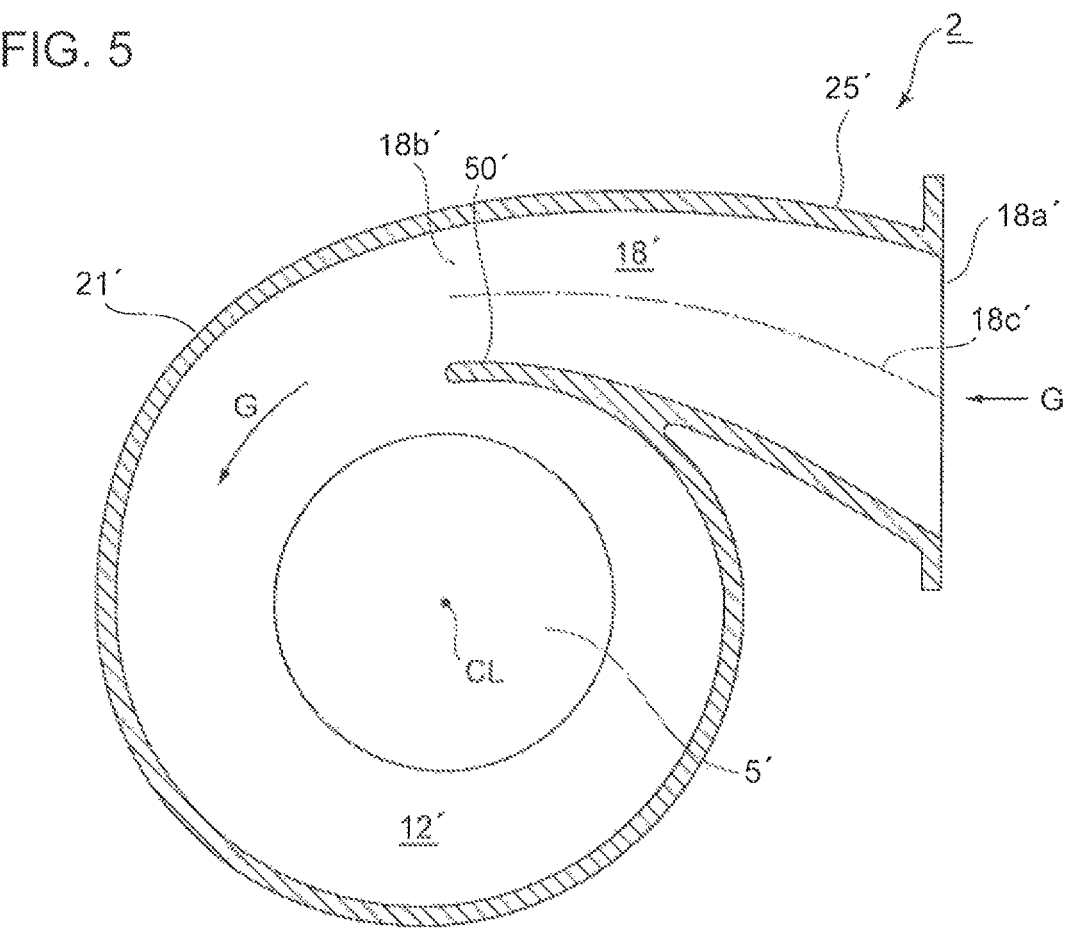
FIG. 5 is a cross-sectional view of a typical turbine housing, which is a comparative example, corresponding to FIG. 4.
Figure 6:
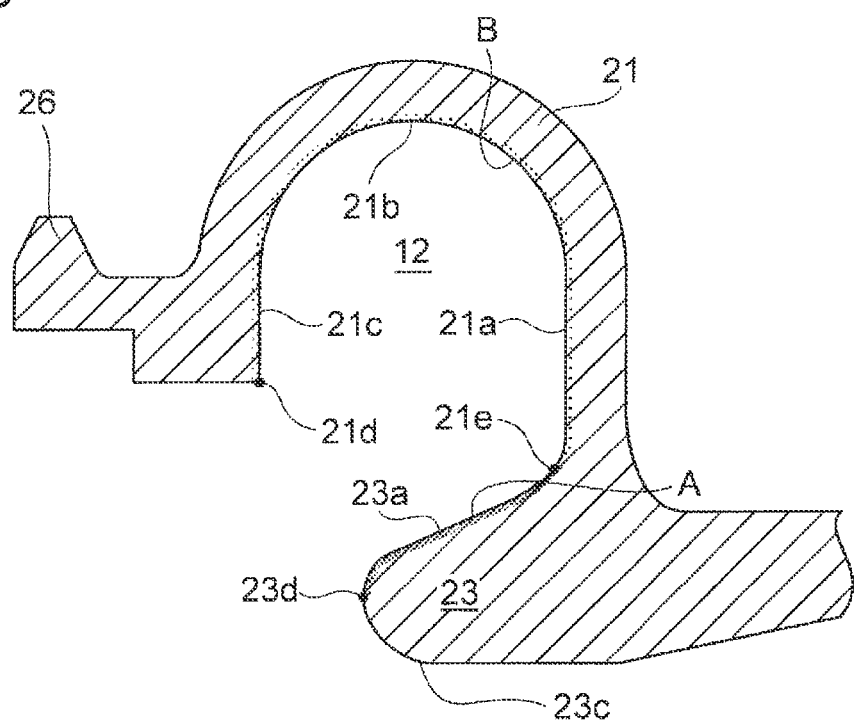
FIG. 6 is a diagram showing a modified example of a turbine housing according to an embodiment.
Figure 10:
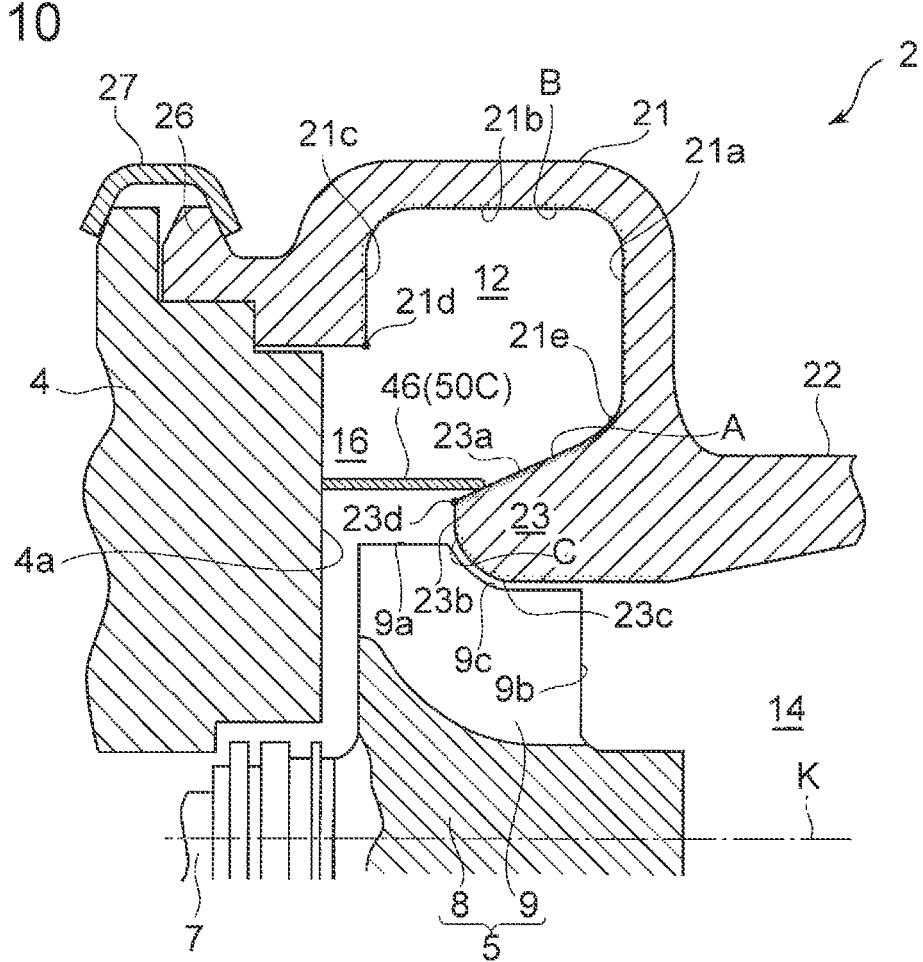
FIG. 10 is a partial cross-sectional view of a turbine housing according to an embodiment of the present invention, taken along the axial direction of the turbine wheel of the turbine housing.
Figure 11:
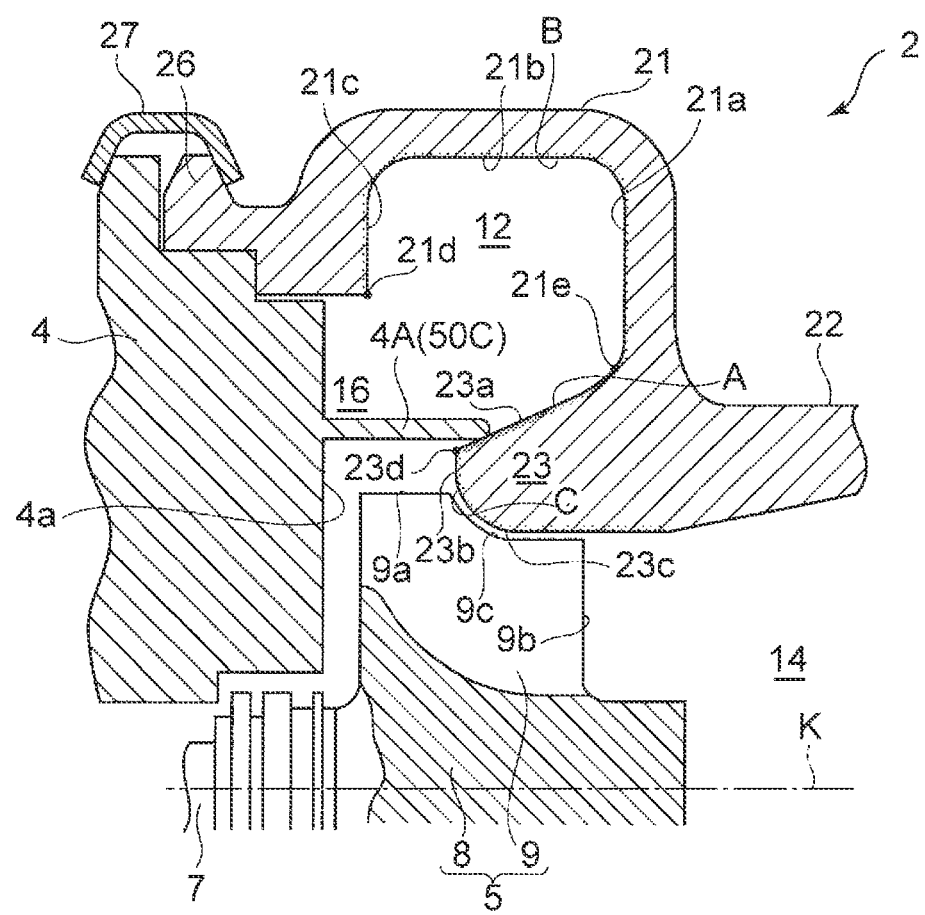
FIG. 11 is a partial cross-sectional view of a turbine housing according to an embodiment of the present invention, taken along the axial direction of the turbine wheel of the turbine housing.
Figure 12:
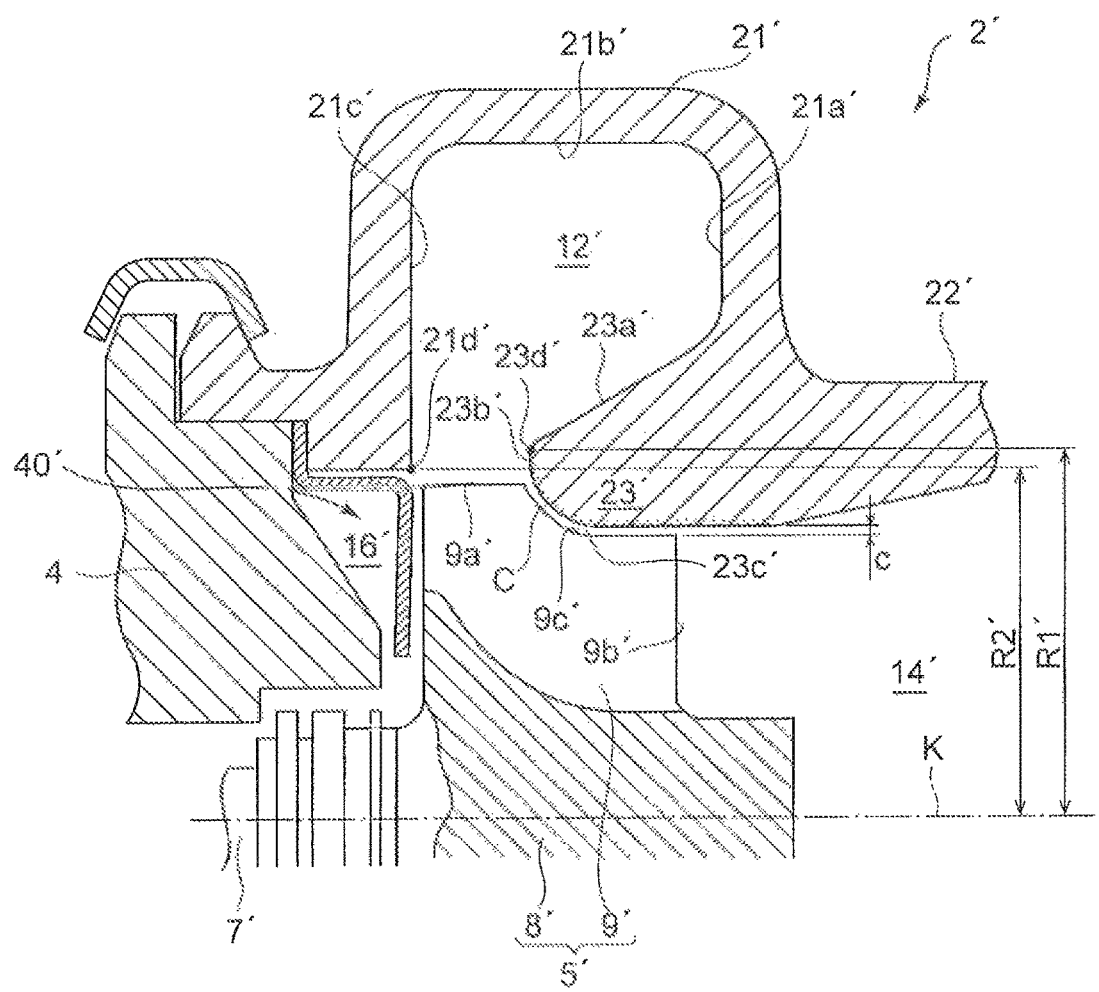
FIG. 12 is a cross-sectional view of a typical turbine housing, which is a comparative example.

FIG. 2 is a partial cross-sectional view of a turbine housing 2 according to an embodiment of the present invention, taken along the axial direction of the turbine wheel of the turbine housing 2. FIG. 3 is a cross-sectional view showing the shroud side of the Y1-Y1 cross section in FIG. 2. FIG. 4 is a cross-sectional view showing the hub side of the Y1-Y1 cross section in FIG. 2. FIG. 5 is a cross-sectional view of a typical turbine housing 2', which is a comparative example, corresponding to FIG. 4. FIG. 6 is a diagram showing a modified example of the turbine housing 2 according to an embodiment. FIGS. 7, 8, 9A to 9C, 10, 11 are each a partial cross-sectional view of the turbine housing 2 according to an embodiment of the present invention, taken along the axial direction of the turbine wheel of the turbine housing 2. FIG. 9D is a cross-sectional view showing the hub side of the Y2-Y2 cross section in FIGS. 9A to 9C. FIG. 12 is a cross-sectional view of the typical turbine housing 2', which is a comparative example. For the turbine housing 2' of the comparative example in FIGS. 5 and 12, features similar to those of the turbine housing 2 according to an embodiment of the present invention are indicated by the same reference numeral but suffixed with an apostrophe.

As depicted in FIGS. 1 and 2, the turbine housing 2 according to at least one embodiment of the present invention is a turbine housing 2 made by casting. The turbine housing 2 includes a scroll part 21, an exhaust duct part 22, and a shroud part 23 formed at a connection section between the scroll part 21 and the exhaust duct part 22. In other words, the turbine housing 2 includes the scroll part 21, the exhaust duct part 22, and the shroud part 23 formed integrally by casting.

Further, as depicted in FIG. 3, the turbine housing 2 includes an intake duct part 25 formed integrally by casting at the inlet side of the scroll flow path 12.

As depicted in FIGS. 2 and 3, the scroll part 21 forms the scroll flow path 12 of an annular shape for flowing the exhaust gas G around the turbine wheel 5 to be supplied to the turbine wheel 5. In the depicted embodiment, the scroll part 21 has wall surfaces facing the scroll flow path 12, including: a shroud-side wall surface 21a and a hub-side wall surface 21c extending in a direction orthogonal to the extending direction of the axis K of the turbine wheel 5; and an outer-peripheral-side wall surface 21b extending along the extending direction of the axis K and connecting the shroud-side wall surface 21a and the hub-side wall surface 21c. Further, in the depicted embodiment, a connection portion 26 to be coupled with the bearing housing 4 via a coupling 27 is formed on the back-face side of the scroll part 21.

Further, in another embodiment as depicted in FIG. 6, the scroll part 21 has wall surfaces facing the scroll flow path 12, including: a shroud-side wall surface 21a and a hub-side wall surface 21c extending in a direction orthogonal to the extending direction of the axis K of the turbine wheel 5; and an outer-peripheral-side wall surface 21b having an arc shape or a semi-circular shape and connecting the shroud-side wall surface 21a and the hub-side wall surface 21c.

The shape of the scroll part 21 depicted in FIGS. 2, 3, and 6 is a mere example and not to limit the scope of the present invention. The shape of the scroll part 21 only needs to be capable of forming the scroll flow path 12 through which the exhaust gas G flows, and may be selected from a variety of shapes.

As depicted in FIGS. 1 and 2, the exhaust duct part 22 forms an exhaust flow path 14. The exhaust gas G from the turbine wheel 5 flows through the exhaust flow path 14 along the axial direction of the turbine wheel 5. In the depicted embodiment, as depicted in FIG. 1, a flange portion 24 to be flange-joined to a non-depicted exhaust duct is formed on the front side of the exhaust duct part 22.

As depicted in FIGS. 1 and 2, the shroud part 23 is disposed so as to protrude toward the hub at the connection section between the scroll part 21 and the exhaust duct part 22. The outer peripheral surface 23a of the shroud part 23 faces the scroll flow path 12, and the inner peripheral surface 23c of the shroud part 23 is formed with a predetermined gap c provided between the inner peripheral surface 23c and outer peripheral edges 9c of the rotor blades 9 of the turbine wheel 5.

In the depicted embodiment, the outer peripheral surface 23a of the shroud part 23 includes an inclined surface inclined from the extending direction of the axis K of the turbine wheel 5, and extends obliquely from a tip 23d of the shroud part 23 toward an inner peripheral edge 21e of the shroud-side wall surface 21a of the scroll part 21. Further, a parallel surface 23b is formed between the outer peripheral surface 23a and the inner peripheral surface 23c of the shroud part 23, the parallel surface 23b extending in a direction orthogonal to the extending direction of the axis K of the turbine wheel 5. Further, as depicted in FIG. 2, if the shroud part 23 has the parallel surface 23b, the tip 23d of the shroud part 23 is at a position on the radially outer side of the parallel surface 23b. If the shroud part 23 does not have the parallel surface 23b but has a tip end portion formed into a curved shape, the tip 23d is a portion disposed closest to the hub, as shown in FIG. 6.

As depicted in FIGS. 2, 7, 8, 9A to 9C, 10, and 11, the turbine housing 2 according to at least one embodiment of the present invention has an opening part 16 formed on the hub side of the scroll part 21, the opening part 16 having a radius R2 that satisfies a relationship R1<R2, provided that R1 is a radial-directional distance from the axis K of the turbine wheel 5 to the tip 23d of the shroud part 23, and R2 is a radial-directional distance from the axis K of the turbine wheel 5 to the inner peripheral edge 21d of the hub-side wall surface 21c of the scroll part 21, in a cross-section taken along the extending direction of the axis K of the turbine wheel 5. Further, the roughness of a flow-path surface in a region A is smaller than that in a region B, provided that the region A is a predetermined region from the tip 23d of the shroud part 23 and the region B is a predetermined region adjacent to the region A, among flow-path surfaces 21a, 21b, 21c, 23a of the shroud part 23 and the scroll part 21 facing the scroll flow path 12 at the outer side, in the radial direction, of the tip 23d of the shroud part 23, in a cross section taken along the extending direction of the axis K of the turbine wheel 5. The roughness of a flow-path surface can be evaluated by metric average roughness (Ra) specified in JIS B0601-2001, for instance.

The turbine housing 2 according to the above embodiment has an opening part 16 formed on the hub side of the scroll part 21, the opening part 16 having a radius R2 that satisfies a relationship R1<R2, provided that R1 is a radial-directional distance from the axis K of the turbine wheel 5 to the tip 23d of the shroud part 23, and R2 is a radial-directional distance from the axis K of the turbine wheel 5 to the inner peripheral edge 21d of the hub-side wall surface 21c of the scroll part 21, in a cross-section taken along the extending direction of the axis K of the turbine wheel 5.

In contrast, for the opening part 16' of the turbine housing 2' of the typical comparative example illustrated in FIG. 12, the radius R2' satisfies a relationship R1'≥R2'. In the turbine housing 2' of the comparative example, although the parallel surface 23b' and the inner peripheral surface 23c' (region C) are processed, the radius R2' of the opening part 16 has a relationship R1'≥R2', and thus it is difficult to further process the outer peripheral surface 23a' of the shroud part 23'.

Accordingly, with the turbine housing 2 of the present embodiment, it is possible to make use of the opening part 16 which is larger than a typical opening to process a flow-path surface in the region A corresponding to the inner peripheral side of the scroll flow path 12 in particular where the flow rate is high and an influence on the flow resistance is significant, and to reduce the roughness of the flow-path surface, which makes it possible to reduce the flow resistance of the exhaust gas G in the turbine housing 2 and to improve the efficiency of the turbocharger 1.

The method of processing the flow-path surface of the region A is not particularly limited. For instance, the method may be machine processing that inserts a tool bit into the casted turbine housing 2 through the opening part 16, and cuts or grinds the flow-path surface of the region A.

In some embodiments, the method may be turning-processing that inserts a tool bit into the casted turbine housing through the opening part 16, and cuts or grinds the flow-path surface of the region A by turning the casted turbine housing 2.

In some embodiments, as depicted in FIGS. 2, 7, 8, 9A to 9C, 10, 11, an existence range of the region A in the radial direction includes at least a part of a range of from 1.15 D to 1.4 D, provided that D is the outer diameter of the turbine wheel 5.

In the depicted embodiment, the inner diameter at the tip 23d of the shroud part 23 is approximately 1.15 D, and the inner diameter at the position of the inner peripheral edge 21e of the shroud-side wall surface 21a of the scroll part 21 is approximately 1.4 D. That is, in the depicted embodiment, the range of from 1.15 D to 1.4 D, the existence range of the region A in the radial direction, is an inclined surface corresponding to the outer peripheral surface 23a of the shroud part 23.

According to this embodiment, the region A at least includes the inner peripheral side of the scroll flow path 12 in particular, where the flow rate is high and an influence on the flow resistance is significant. Further, if the outer peripheral surface 23a of the shroud part 23 includes an inclined surface as in the present embodiment, the outer peripheral surface 23a contacts a fluid in a larger contact area, and thus the influence on the flow resistance is even greater. Thus, according to the above embodiment, with the region A formed in the above described range, it is possible to reduce the flow resistance of the exhaust gas in the turbine housing 2 and to improve the efficiency of the turbocharger 1.

In some embodiments, as depicted in FIGS. 2, 7, 8, and 9A to 9C, the turbine housing 2 further includes a first plate member 40 of an annular shape disposed in the opening part 16 described above, the first plate member 40 having a flow-path portion 40a facing the scroll flow path 12 and a back-face portion 40b disposed with a gap from the back surface of the turbine wheel 5.

In the depicted embodiment, the first plate member 40 has an outer peripheral edge portion 40c which extends in a direction orthogonal to the extending direction of the axis K of the turbine wheel 5, and which is nipped between the turbine housing 2 and the bearing housing 4, whereby the first plate member 40 is fixed inside the turbine housing 2. The outer peripheral edge portion 40c is connected to the flow-path portion 40a facing the scroll flow path 12, via a stepped portion 40d extending along the extending direction of the axis K of the turbine wheel 5. The flow-path portion 40a extends in a direction orthogonal to the extending direction of the axis K of the turbine wheel 5. The back-face portion 40b extends toward the axis K while slightly inclining backward so that a predetermined gap is formed between the back-face portion 40b and the back face of the turbine wheel 5. The flow-path portion 40a and the back-face portion 40b have a function to prevent the exhaust gas G from leaking toward the back face of the turbine wheel 5 while the exhaust gas G flows through the scroll flow path 12.

In the depicted embodiment, the first plate member 40 is made from sheet metal. Besides sheet metal, the first plate member 40 may be made by precision casting, or by metal injection molding.

In this embodiment, provided is the first plate member 40 having the flow-path portion 40a facing the scroll flow path 12 in the opening part 16. The first plate member 40 is a member separate from the turbine housing 2 made by casting, and the roughness of the surface of the first plate member 40 can be easily set to be smaller than the surface roughness of the turbine housing 2. Thus, according to this embodiment, by reducing the roughness of the flow-path portion 40a of the first plate member 40 facing the scroll flow path 12, it is possible to reduce the flow resistance of exhaust gas flowing through the scroll flow path 12.

In some embodiments, as shown in FIG. 4, the turbine housing 2 further includes an intake duct part 25 forming an intake flow path 18 for guiding the exhaust gas G taken in from outside of the turbine housing 2 to the scroll flow path 12. A tongue portion 50 separating the intake flow path 18 and the scroll flow path 12 is formed by a tongue-portion member 50A provided as a separate member from the turbine housing 2. The tongue-portion member 50A extends from the side of the first plate member 40 toward the shroud part 23 as depicted in FIGS. 7, 8, 9A, and 9B.

In the embodiment depicted in FIG. 4, a tongue portion 50B shorter than the typical tongue portion 50' is formed on the connection section between the intake duct part 25 and the scroll part 21 of the turbine housing 2. The tongue-portion member 50A is disposed continuously from the tongue portion 50B of the turbine housing 2, and extends to a rear end position of the typical tongue portion 50'.

According to this embodiment, the tongue portion 50 is formed by the tongue-portion member 50A provided separately from the turbine housing 2. Thus, when the inside of the turbine housing 2 is processed through the opening part 16 after casting, the tongue portion 50 does not stand in the way of the processing, unlike a case in which the turbine housing 2' made by casting and the tongue portion 50' are formed integrally. Thus, the inside of the turbine housing 2 can be processed easily.

Further, as compared to a case in which the tongue portion 50 is integrally formed with the turbine housing 2 made by casting, it is possible to form the tongue portion 50 to have a smaller thickness. Accordingly, it is possible to suppress flow strain that occurs downstream the tongue portion 50, and thus it is possible to reduce the flow resistance of the exhaust gas G flowing from the intake flow path 18 to the scroll flow path 12.

Figure 7:
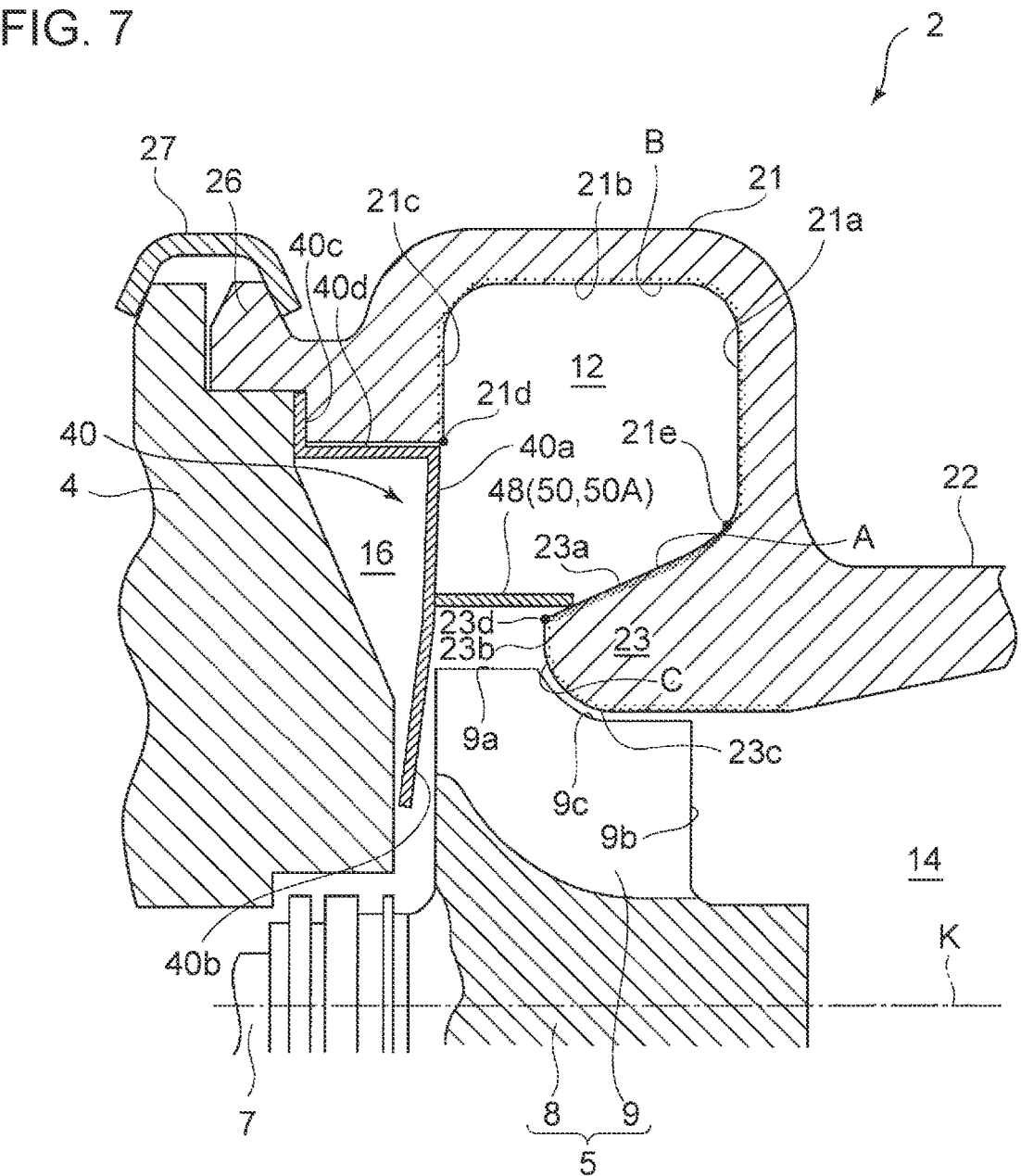
FIG. 7 is a partial cross-sectional view of a turbine housing according to an embodiment of the present invention, taken along the axial direction of the turbine wheel of the turbine housing.

In some embodiments, as depicted in FIG. 7, the tongue-portion member 50A includes the fourth plate member 48 connected to the flow-path portion 40a of the first plate member 40. The fourth plate member 48 is connected to the flow-path portion 40a of the first plate member 40 by welding, for instance. The fourth plate member 48 extends along the extending direction of the axis K of the turbine wheel 5, and is in contact with the outer peripheral surface 23a of the shroud part 23 having a tip end portion formed by an inclined surface.

In the depicted embodiment, the fourth plate member 48 is made from sheet metal. Besides sheet metal, the fourth plate member 48 may be made by precision casting, or metal injection molding.

According to this embodiment, the tongue portion 50 is formed by the fourth plate member 48 connected to the first plate member 40 by welding or the like, and thereby it is possible to form the tongue portion 50 provided as a separate member from the turbine housing 2 with a simple structure.

The outer peripheral surface 23a of the shroud part 23 making contact with the tip end portion of the fourth plate member 48 is an inclined surface. Accordingly, the outer peripheral surface 23a can support a force that acts in the radial direction from the radially outer side toward the radially inner side to the fourth plate member 48 due to a pressure difference, and thereby it is possible to prevent oscillation and deformation of the fourth plate member 48 formed to have a small thickness.

Figure 8:
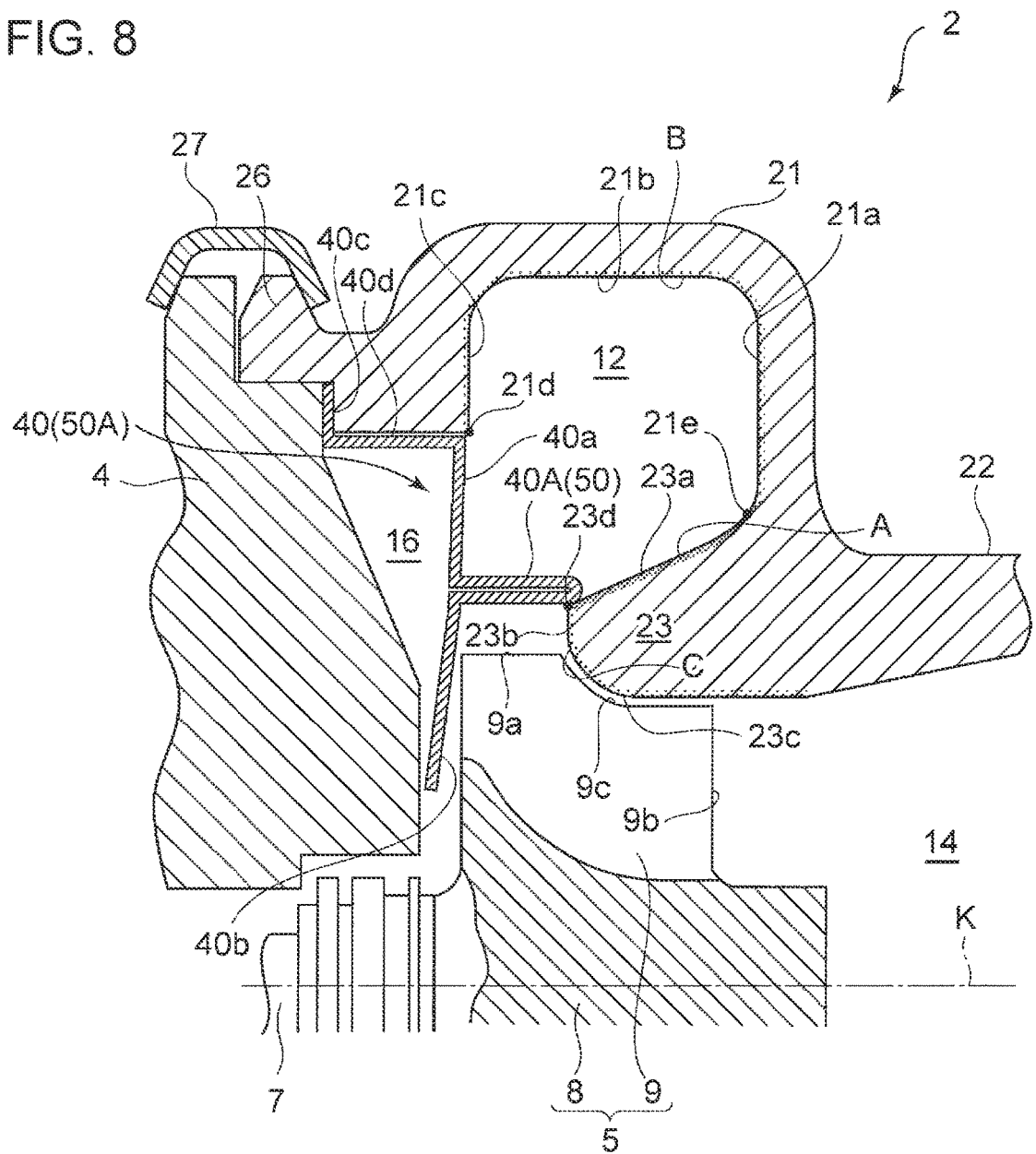
FIG. 8 is a partial cross-sectional view of a turbine housing according to an embodiment of the present invention, taken along the axial direction of the turbine wheel of the turbine housing.

In some embodiments, as depicted in FIG. 8, the tongue-portion member 50A is the above described first plate member 40. The first plate member 40 has a bend portion 40A made from sheet metal and bended along the extending direction of the axis K of the turbine wheel 5. The bend portion 40A forms the tongue portion 50. The bend portion 40A is formed by press work, for instance. The bend portion 40A extends along the extending direction of the axis K of the turbine wheel 5, and has a tip end portion making contact with the outer peripheral surface 23a, which is an inclined surface, of the shroud part 23.

According to this embodiment, the tongue portion 50 is formed by the bend portion 40A of the first plate member 40, and thereby it is possible to form the tongue portion 50 made from sheet metal as a separate member from the turbine housing 2, with a simple structure made of fewer parts.

The outer peripheral surface 23a of the shroud part 23 making contact with the tip end portion of the bend portion 40A is an inclined surface. Accordingly, the outer peripheral surface 23a can support a force that acts in the radial direction from the radially outer side toward the radially inner side to the bend portion 40A due to a pressure difference, and thereby it is possible to prevent oscillation and deformation of the bend portion 40A of the first plate member made from sheet metal.

Figure 9C:
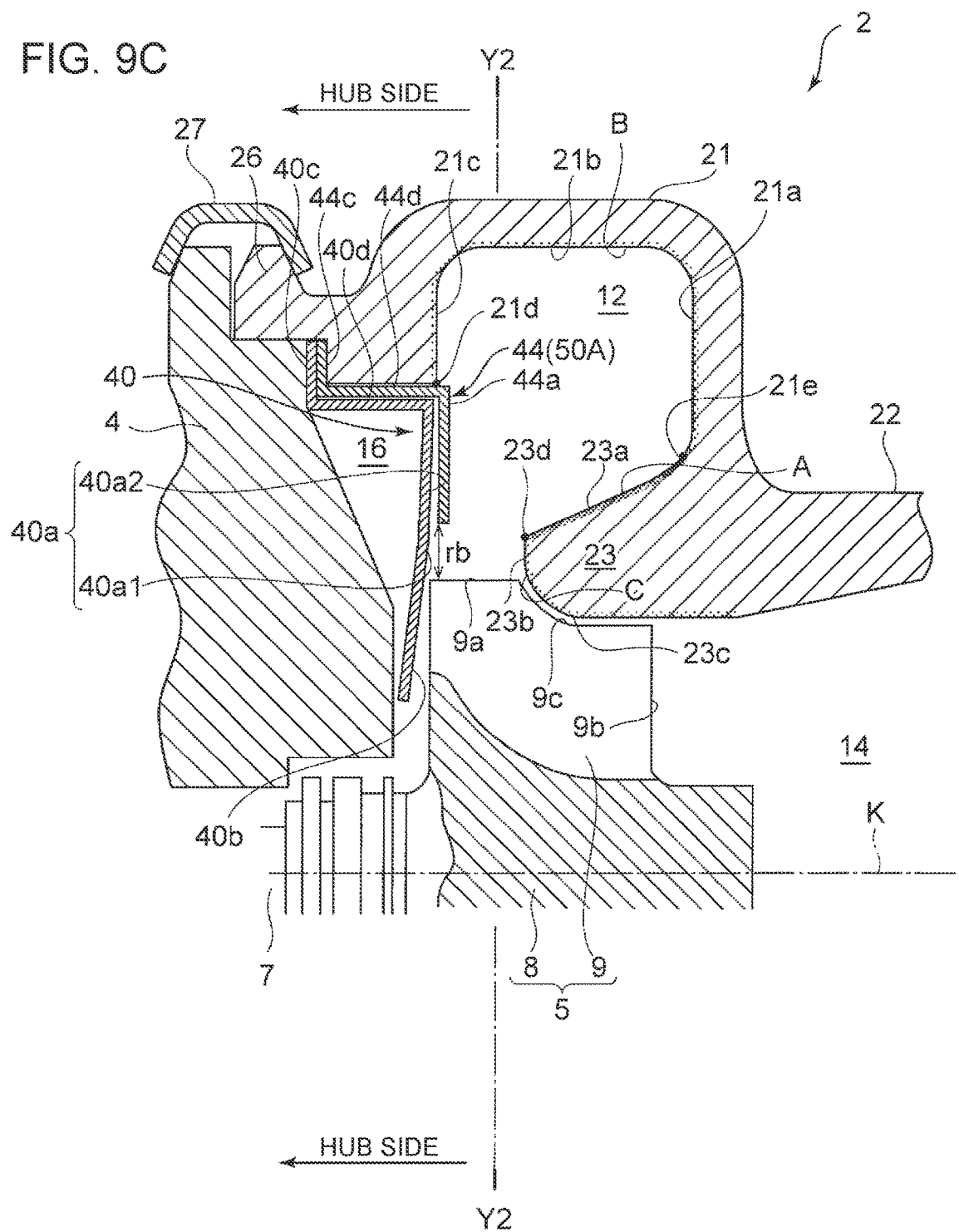
FIG. 9C is a partial cross-sectional view of a turbine housing according to an embodiment of the present invention, taken along the axial direction of the turbine wheel of the turbine housing, showing a part in the c-c cross section in FIG. 9D.
Figure 9D:
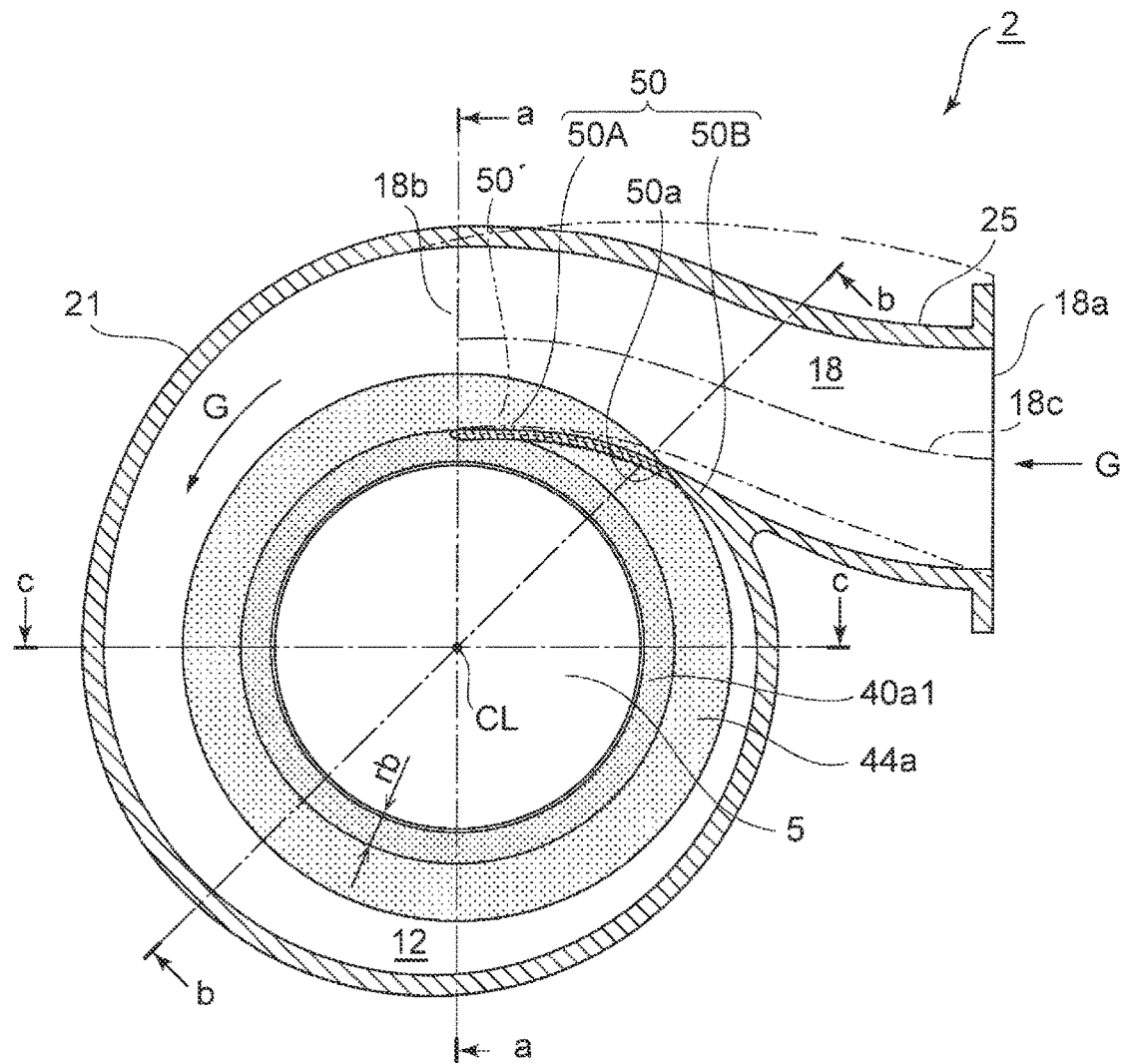
FIG. 9D is a cross-sectional view showing the hub side of the Y2-Y2 cross section in FIGS. 9A to 9C.

In some embodiments, as depicted in FIGS. 9A to 9C, the turbine housing 2 further includes the second plate member 44 disposed so as to cover a part of the flow-path portion 40a of the first plate member 40 in the opening part 16 of the turbine housing 2. As depicted in FIGS. 9A and 9B, the above described tongue-portion member 50A is the above described second plate member 44.

Further, in some embodiments, as depicted in FIGS. 9A and 9B, the second plate member 44 has a bend portion 44A made from sheet metal and bended along the axial direction of the turbine wheel 5. The bend portion 44A forms the above described tongue portion 50.

In the depicted embodiment, the second plate member 44 has an outer peripheral edge portion 44c which extends in a direction orthogonal to the extending direction of the axis K of the turbine wheel 5, and which is nipped between the turbine housing 2 and the bearing housing 4, whereby the second plate member 44 is fixed inside the turbine housing 2. The outer peripheral edge portion 44c is connected to the flow-path portion 44a facing the scroll flow path 12, via a stepped portion 44d extending along the extending direction of the axis K of the turbine wheel 5. The flow-path portion 44a extends in a direction orthogonal to the extending direction of the axis K of the turbine wheel 5. The flow-path portion 44a covers a part 40a2 of the flow-path portion 40a of the first plate member 40. Another part 40a1, which is a remainder after excluding the part 40a2 covered with the flow-path portion 44a, directly faces the scroll flow path 12. The bend portion 44A extends along the extending direction of the axis K of the turbine wheel 5 from the flow-path portion 44a toward the shroud part 23.

As depicted in FIGS. 9A and 9B, the bend portion 44A is bended along the extending direction of the axis K of the turbine wheel 5 from the intermediate position of the flow-path portion 44a. As depicted in FIG. 9B, the flow-path portion 44a is divided into the part 44a1 on the radially outer side and the part 44a2 on the radially inner side across the bend portion 44A.

In the embodiment depicted in FIGS. 9A and 9B, the bend portion 44A comprises a folded-back double plate, but is not limited to this. In another embodiment, though not depicted, the bend portion 44A is not folded back and is formed by a single-layer plate.

In the depicted embodiment, the second plate member 44 is made from sheet metal. Besides sheet metal, the second plate member 44 may be made by precision casting, or metal injection molding.

According to this embodiment, it is possible to form the tongue portion 50 provided as a separate member from the turbine housing 2 with a simple structure without performing a special processing on the first plate member 40.

The outer peripheral surface 23a of the shroud part 23 making contact with the tip end portion of the bend portion 44A is an inclined surface. Accordingly, the outer peripheral surface 23a can support a force that acts in the radial direction from the radially outer side toward the radially inner side to the bend portion 44A due to a pressure difference, and thereby it is possible to prevent oscillation and deformation of the bend portion 44A of the second plate member 44 formed to have a small thickness.

In some embodiments, as depicted in FIGS. 9A to 9D, the second plate member 44 includes an annular member extending along the entire periphery in the circumferential direction of the turbine wheel 5. As depicted in FIGS. 9A to 9C, in a cross section along the extending direction of the axis K of the turbine wheel 5, the flow-path portion 40a1 facing the scroll flow path 12, excluding the part 40a2 of the first plate member 40 covered with the second plate member 44, has the same width rb, in the radial direction, over the entire periphery in the circumferential direction of the turbine wheel 5, as depicted in FIG. 9D. In other words, as depicted in FIGS. 9A to 9C, the separation distance rb between the inner peripheral edge of the second plate member 44 and the leading edges 9a of the rotor blades 9 is constant over the entire periphery of the turbine wheel 5 in the circumferential direction.

According to this embodiment, the flow-path surface of the first plate member 40 is exposed to high-temperature exhaust gas at the width rb, in the radial direction, which is constant over the entire periphery of the turbine wheel 5 in the circumferential direction. Accordingly, it is possible to average the heat input amount to the first plate member 40 in the circumferential direction, and to prevent the first plate member 40 from deforming unevenly due to thermal expansion. Thus, it is possible to prevent an increase in the leakage flow of the exhaust gas G to the back-face side of the turbine wheel 5 due to uneven deformation of the first plate member 40.

In some embodiments, as depicted in FIG. 1, coupled to the back-face side of the turbine housing 2 is the bearing housing 4 for housing the bearing devices 10A and 10B for rotatably supporting the rotational shaft 7 coupled to the turbine wheel 5. As shown in FIG. 4, the turbine housing 2 further includes the intake duct part 25 forming the intake flow path 18 for guiding the exhaust gas G taken in from outside of the turbine housing 2 to the scroll flow path 12. Further, as depicted in FIGS. 10 and 11, the tongue portion 50 separating the intake flow path 18 and the scroll flow path 12 in the radial direction is formed by a tongue-portion member 50C provided as a separate member from the turbine housing 2. The tongue-portion member 50C extends from the bearing housing 4 toward the shroud part 23.

In the embodiment depicted in FIGS. 10 and 11, the turbine housing 2 does not include the above described first plate member 40 and the second plate member 44. Instead, a wall surface 4a of the bearing housing 4 is facing the scroll flow path 12, and is disposed at a gap from the back surface of the turbine wheel 5.

According to this embodiment, the tongue portion 50 is formed by the tongue-portion member 50C provided separately from the turbine housing 2. The tongue-portion member 50C extends from the bearing housing 4 toward the shroud part 23. Thus, when the inside of the turbine housing 2 is processed through the opening part 16 after casting, the tongue portion 50 does not interfere with the process, unlike a case in which the turbine housing 2' made by casting and the tongue portion 50' are formed integrally. Thus, the inside of the turbine housing 2 can be processed easily.

In some embodiments, as depicted in FIG. 10, the above described tongue-portion member 50C includes the third plate member 46 connected to the bearing housing 4. The third plate member 46 is connected to the wall surface 4a of the bearing housing 4 by welding, for instance. The third plate member 46 extends along the extending direction of the axis K of the turbine wheel 5, and has a tip end portion which makes contact with the outer peripheral surface 23a, which is an inclined surface, of the shroud part 23.

In the depicted embodiment, the third plate member 46 is made from sheet metal. Besides sheet metal, the third plate member 46 may be made by precision casting, or metal injection molding.

According to this embodiment, the tongue portion 50 is formed by the third plate member 46 made from sheet metal connected to the wall surface 4a of the bearing housing 4. The third plate member 46 is formed as a separate member from the turbine housing 2 made by casting, and thus, as compared to a case in which the tongue portion 50 is integrally formed with the turbine housing 2 made by casting, it is possible to form the tongue portion 50 to have a smaller thickness without difficulty. Accordingly, it is possible to suppress flow strain that occurs downstream the tongue portion 50, and thus it is possible to reduce the flow resistance of exhaust gas flowing from the intake flow path 18 to the scroll flow path 12. Further, it is possible to form the tongue portion 50 with a simple structure of connecting the third plate member 46 to the bearing housing 4.

Moreover, the outer peripheral surface 23a of the shroud part 23 making contact with the tip end portion of the third plate member 46 is an inclined surface. Accordingly, the outer peripheral surface 23a can support a force that acts in the radial direction from the radially outer side toward the radially inner side to the third plate member 46 due to a pressure difference, and thereby it is possible to prevent oscillation and deformation of the third plate member 46 made from sheet metal.

In some embodiments, as depicted in FIG. 11, the above described tongue-portion member 50C includes the protruding portion 4A produced integrally with the bearing housing 4 made by casting. The protruding portion 4A extends along the extending direction of the axis K of the turbine wheel 5 from the wall surface 4a of the bearing housing 4, and has a tip end portion which makes contact with the outer peripheral surface 23a, which is an inclined surface, of the shroud part 23.

According to this embodiment, the tongue portion 50 is formed by the protruding portion 4A integrally produced with the bearing housing 4 made by casting, and thereby it is possible to form the tongue portion 50 as a separate member from the turbine housing 2 with a simple structure.

In some embodiments, as depicted in FIGS. 3, 4, and 9D, in a cross section as seen in the extending direction of the axis K of the turbine wheel 5, a flow-path center 18c of the intake flow path 18 is formed into an S-shaped curve curving outward in the radial direction after curving inward in the radial direction, from the inlet 18a of the intake flow path 18 toward a merging part 18b with the scroll flow path 12. In FIGS. 3, 4, and 9D, the dotted lines show the shape of the intake flow path 18 in the turbine housing 2' of the typical explanatory example depicted in FIG. 5.

In the embodiments depicted in FIGS. 7, 8, 9A to 9C, and 10, the tongue portion 50 is formed by a plate member made from sheet metal. If the tongue portion 50 is formed by a plate member of sheet metal, the tongue portion 50 is thin and thus may oscillate in response to a pressure difference between the outer peripheral side and the inner peripheral side of the tongue portion 50, thus increasing the flow resistance. The pressure decreases due to a high-speed exhaust gas flow at the radially inner side of the tongue portion 50, and is lower than the pressure at the outer peripheral side of the tongue portion 50.

Thus, according to this embodiment, with the flow-path center 18c of the intake flow path 18 formed into an S-shape curve, the flow of exhaust gas flowing the radially outer side of the tongue portion 50 can be turned outward, which makes it possible to reduce the pressure at the radially outer side of the tongue portion 50 and to reduce a pressure difference applied to the tongue portion 50.

The embodiments of the present invention have been described above. However, the present invention is not limited thereto. For instance, various modifications may be applied as long as they do not depart from the object of the present invention.

Description of Reference Numerals

1 Turbocharger
2 Turbine housing
3 Compressor housing
4 Bearing housing
4A Protruding portion
4a Wall surface
5 Turbine wheel
6 Compressor wheel
7 Rotational shaft
8 Hub portion
9 Rotor blade
9a Leading edge
9b Trailing edge
9c Outer peripheral edge
10A, 10B Bearing device
12 Scroll flow path
14 Exhaust flow path 16 Opening part
18 Intake flow path
18a Inlet
18b Merging part
18c Flow-path center
21 Scroll part
21a Shroud-side wall surface (flow-path surface)
21b Outer-peripheral-side wall surface (flow-path surface)
21c Hub-side wall surface (flow-path surface)
21d Inner peripheral edge of hub-side wall surface
21e Inner peripheral edge of shroud-side wall surface
22 Exhaust duct part
23 Shroud part
23a Outer peripheral surface (flow-path surface)
23b Parallel surface
23c Inner peripheral surface
23d Tip end of shroud part
24 Flange portion
25 Intake duct part
26 Connection portion
27 Coupling
40 First plate member
40A Bend portion
40a Flow-path portion
40a1 Portion not covered with second plate member
40a2 Portion covered with second plate member
40b Back-face portion
40c Outer peripheral edge portion
40d Stepped portion
44 Second plate member
44A Bend portion
44a Flow-path portion
44a1 Radially-outside flow-path portion
44a2 Radially-inside flow-path portion
44c Outer peripheral edge portion
44d Stepped portion
46 Third plate member
48 Fourth plate member
50 Tongue portion
50A Tongue-portion member
50B Tongue-portion member
50C Tongue-portion member

The invention claimed is:

1. A turbine housing made by casting for housing a turbine wheel configured to rotate by exhaust gas, comprising:
a scroll part forming a scroll flow path of an annular shape through which the exhaust gas to be supplied to the turbine wheel flows, around the turbine wheel;
an exhaust duct part forming an exhaust flow path through which the exhaust gas having passed through the turbine wheel flows along an axial direction of the turbine wheel; and
a shroud part protruding toward a hub at a connection section between the scroll part and the exhaust duct part, the shroud part having an outer peripheral surface facing the scroll flow path and an inner peripheral surface formed at a predetermined gap from rotor blades of the turbine wheel,
wherein, an opening part is formed on a hub side of the scroll part, the opening part having a radius R2 which satisfies a relationship R1<R2, provided that R1 is a radial directional distance from an axis of the turbine wheel to a tip of the shroud part and R2 is a radial directional distance from the axis of the turbine wheel to an inner peripheral edge of a hub-side wall surface of the scroll part in a cross section taken along the axial direction of the turbine wheel, and
wherein a roughness of a flow-path surface in a region A is smaller than a roughness of a flow-path surface in a region B, provided that the region A is a region extending over a predetermined range from the tip of the shroud part toward a radial outer direction, the region A being processed after casting the turbine housing, and the region B is a region extending over predetermined range from boundary position with the region A toward the radial outer direction, among flow-path surfaces of the shroud part and the scroll part facing the scroll flow path radially outward of the tip of the shroud part in a cross section taken along the axial direction of the turbine wheel,
where each roughness is an arithmetic average roughness specified in JIS B060-2001.

2. The turbine housing according to claim 1,
wherein an existence range of the region A in the radial direction includes at least a part of a range of from 1.15D to 1.4D centered on the axis of the turbine wheel, provided that D is an outer diameter of the turbine wheel.

3. The turbine housing according to 1,
wherein the outer peripheral surface of the shroud part includes an inclined surface inclined from the axial direction of the turbine wheel, and the region A includes at least a part of the outer peripheral surface, in a cross section along the axial direction of the turbine wheel.

4. The turbine housing according to claim 1, further comprising a first plate member of an annular shape disposed in the opening part, the first plate member having a flow-path portion facing the scroll flow path and a back-face portion disposed with a gap from a back face of the turbine wheel.

5. The turbine housing according to claim 4, further comprising:
an intake duct part forming an intake flow path for guiding the exhaust gas taken in from outside the turbine housing to the scroll flow path; and
a tongue portion separating the intake flow path and the scroll flow path in the radial direction and being formed by a tongue-portion member provided as a separate member from the turbine housing, the tongue-portion member extending from a side of the first plate member toward the shroud part.

6. The turbine housing according to claim 5,
wherein the tongue-portion member is the first plate member including a bend portion made from sheet metal and folded along the axial direction of the turbine wheel, the bend portion forming the tongue portion.

7. The turbine housing according to claim 6,
wherein a flow-path center of the intake flow path is formed into n S-shaped curve curving outward in the radial direction after curving inward in the radial direction, from an inlet part of the intake flow path toward a merging part with the scroll flow path, in a cross section as seen from the axial direction of the turbine wheel.

8. The turbine housing according to claim 5, further comprising a second plate member disposed so as to cover a part of a flow-path portion of the first plate member in the opening part of the turbine housing,
wherein the tongue-portion member includes the second plate member.

9. The turbine housing according to claim 8,
wherein the second plate member has a bend portion made from sheet metal and folded along the axial direction of the turbine wheel, the bend portion forming the tongue portion.

10. The turbine housing according to claim 9,
wherein a flow-path center of the intake flow path is formed into g S-shaped curve curving outward in the radial direction after curving inward in the radial direction, from an inlet part of the intake flow path toward a merging part with the scroll flow path, in a cross section as seen from the axial direction of the turbine wheel.

11. The turbine housing according to claim 8,
wherein the second plate member is-includes an annular member extending over an entire periphery of the turbine wheel in a circumferential direction, and
wherein a flow-path portion facing the scroll flow path including an uncovered a part of the first plate member not covered with the second plate member has a radial directional width which is constant over the entire periphery of the turbine wheel in the circumferential direction, in a cross section along the axial direction of the turbine wheel.

12. The turbine housing according to claim 5,
wherein the region A is formed to have a radial directional width which is constant over an entire periphery of the turbine wheel in a circumferential direction, in a cross section seen in the axial direction of the turbine wheel.

13. The turbine housing according to claim 1,
wherein a bearing housing for housing bearing devices rotatably supporting a rotational shaft coupled to the turbine wheel is coupled to a back-face side of the turbine housing,
wherein the turbine housing further comprises an intake duct part forming an intake flow path for guiding the exhaust gas taken in from outside the turbine housing to the scroll flow path, and
wherein a tongue portion separating the intake flow path and the scroll flow path in the radial direction is formed by a tongue-portion member provided as a separate member from the turbine housing, the tongue-portion member extending from the bearing housing toward the shroud part.

14. The turbine housing according to claim 13, wherein the tongue-portion member includes a third plate member connected to the bearing housing.

15. The turbine housing according to claim 14, wherein the third plate member is made from sheet metal.

16. The turbine housing according to claim 15,
wherein a flow-path center of the intake flow path is formed into g S-shaped curve curving outward in the radial direction after curving inward in the radial direction, from an inlet part of the intake flow path toward a merging part with the scroll flow path, in a cross section as seen from the axial direction of the turbine wheel.

17. The turbine housing according to claim 13,
wherein the region A is formed to have a radial directional width which is constant over an entire periphery of the turbine wheel in a circumferential direction, in a cross section seen in the axial direction of the turbine wheel.

18. A method of producing a turbine housing for housing a turbine wheel configured to rotate by exhaust gas,
the turbine housing comprising:
a scroll part forming a scroll flow path of an annular shape through which the exhaust gas to be supplied to the turbine wheel flows, around the turbine wheel;
an exhaust duct part forming an exhaust flow path through which the exhaust gas having passed through the turbine wheel flows along an axial direction of the turbine wheel; and
a shroud part protruding toward a hub at a connection section between the scroll part and the exhaust duct part, the shroud part having an outer peripheral surface facing the scroll flow path and an inner peripheral surface formed at a predetermined gap from rotor blades of the turbine wheel,
wherein, an opening part is formed on a hub side of the scroll part, the opening part having a radius R2 which satisfies a relationship R1<R2, provided that R1 is a radial directional distance from an axis of the turbine wheel to a tip of the shroud part and R2 is a radial directional distance from the axis of the turbine wheel to an inner peripheral edge of a hub-side wall surface of the scroll part in a cross section taken along the axial direction of the turbine wheel,
the method comprising:
processing a flow-path surface in a region A after casting the turbine housing so that a roughness of the flow-path surface in the region A becomes smaller than a roughness of a flow-path surface in a region B, provided that the region A is a region extending over a predetermined range from the tip of the shroud part toward a radial outer direction and the region B is a region extending over predetermined range from boundary position with the region A toward the radial outer direction, among flow-path surfaces of the shroud part and the scroll part facing the scroll flow path on an outer side, in a radial direction, of the tip of the shroud part in a cross section taken along the axial direction of the turbine wheel.

19. The method of producing a turbine housing according to claim 18,
wherein the step of processing the flow-path surface of the region A comprises machine processing.

20. The method of producing a turbine housing according to claim 19,
wherein the step of processing the flow-path surface of the region A comprises turning-processing which includes: inserting a tool bit into the turbine housing made by casting, through the opening part; and rotating the turbine housing made by casting to cut or grind the flow-path surface of the region A.

* * * * *